United States Patent
Lundh et al.

(10) Patent No.: US 6,373,834 B1
(45) Date of Patent: Apr. 16, 2002

(54) SYNCHRONIZATION FOR CELLULAR TELECOMMUNICATIONS NETWORK

(75) Inventors: Peter Carl Birger Lundh, Skärholmen; Jasmina Nesic, Stockholm, both of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/095,585

(22) Filed: Jun. 11, 1998

Related U.S. Application Data
(60) Provisional application No. 60/068,096, filed on Dec. 19, 1997.

(51) Int. Cl.[7] .................................................. H04J 3/06
(52) U.S. Cl. ..................... 370/350; 370/509; 370/310.2; 455/502; 375/356
(58) Field of Search ................................. 370/328, 329, 370/335, 336, 337, 342, 389, 395, 345, 347, 350, 498, 503, 509, 510, 310.1, 310.2; 375/356, 358; 455/502

(56) References Cited

U.S. PATENT DOCUMENTS

| | | | |
|---|---|---|---|
| 4,337,463 A | | 6/1982 | Vangen |
| 4,521,897 A | | 6/1985 | Merrell |
| 5,245,634 A | | 9/1993 | Averbuch |
| 5,268,933 A | | 12/1993 | Averbuch |
| 5,388,102 A | | 2/1995 | Griffith et al. |
| 5,473,668 A | | 12/1995 | Nakahara |
| 5,586,119 A | | 12/1996 | Scribano et al. |
| 5,590,160 A | | 12/1996 | Ostman |
| 5,659,569 A | | 8/1997 | Padovani et al. |
| 5,663,715 A | | 9/1997 | Godoroia |
| 5,793,757 A | * | 8/1998 | Uddenfildt ............... 370/335 |
| 5,872,820 A | | 2/1999 | Upadrasta |
| 5,883,897 A | * | 3/1999 | Lin ............................. 370/465 |
| 5,912,886 A | | 6/1999 | Takahashi et al. |
| 5,920,557 A | | 7/1999 | Hirata |
| 5,940,381 A | * | 8/1999 | Freeburg et al. ........... 370/331 |

FOREIGN PATENT DOCUMENTS

| | | |
|---|---|---|
| EP | 0 253 096 A2 | 1/1988 |
| GB | 2 300 789 A | 11/1996 |

OTHER PUBLICATIONS

Fasbender et al., "On Assessing Unidirectional Latencies in Packet–Switched Networks", Towards the Knowledge Millenium, 1997 IEEE International Conference on Communications, ICC'97 Jun. 8–12, 1997, Monreal, Quebec, Canada, Conference Record vol. 1 of 3, pp. 490–494.

* cited by examiner

Primary Examiner—David R. Vincent
Assistant Examiner—Bob A. Phunkulh
(74) Attorney, Agent, or Firm—Nixon & Vanderhye, P.C.

(57) ABSTRACT

Synchronization is effected in a cellular telecommunications network (20) between a master timing unit (60) located at control node (30) of the network and a slave timing unit (STU) located either at the control node or a controlled node, e.g., base station (22), of the network. In accomplishing the synchronization, one of the master timing unit or the slave timing unit serves as an initiating timing unit for transmitting a synchronization analysis command message including a first parameter ($t_1$) to the other of the timing units which serves as a responding timing unit. In response, the responding timing unit sends a synchronization analysis response message which includes at least second parameter ($t_2$) and preferably a third parameter ($t_3$) to the initiating timing unit. The initiating unit uses e.g., parameters extracted from the synchronization analysis response message to determine a synchronization adjustment value for the slave timing unit. When the master timing unit is the initiating timing unit, the master timing unit transmits the synchronization adjustment value in a synchronization updating command message to the slave timing unit.

55 Claims, 16 Drawing Sheets

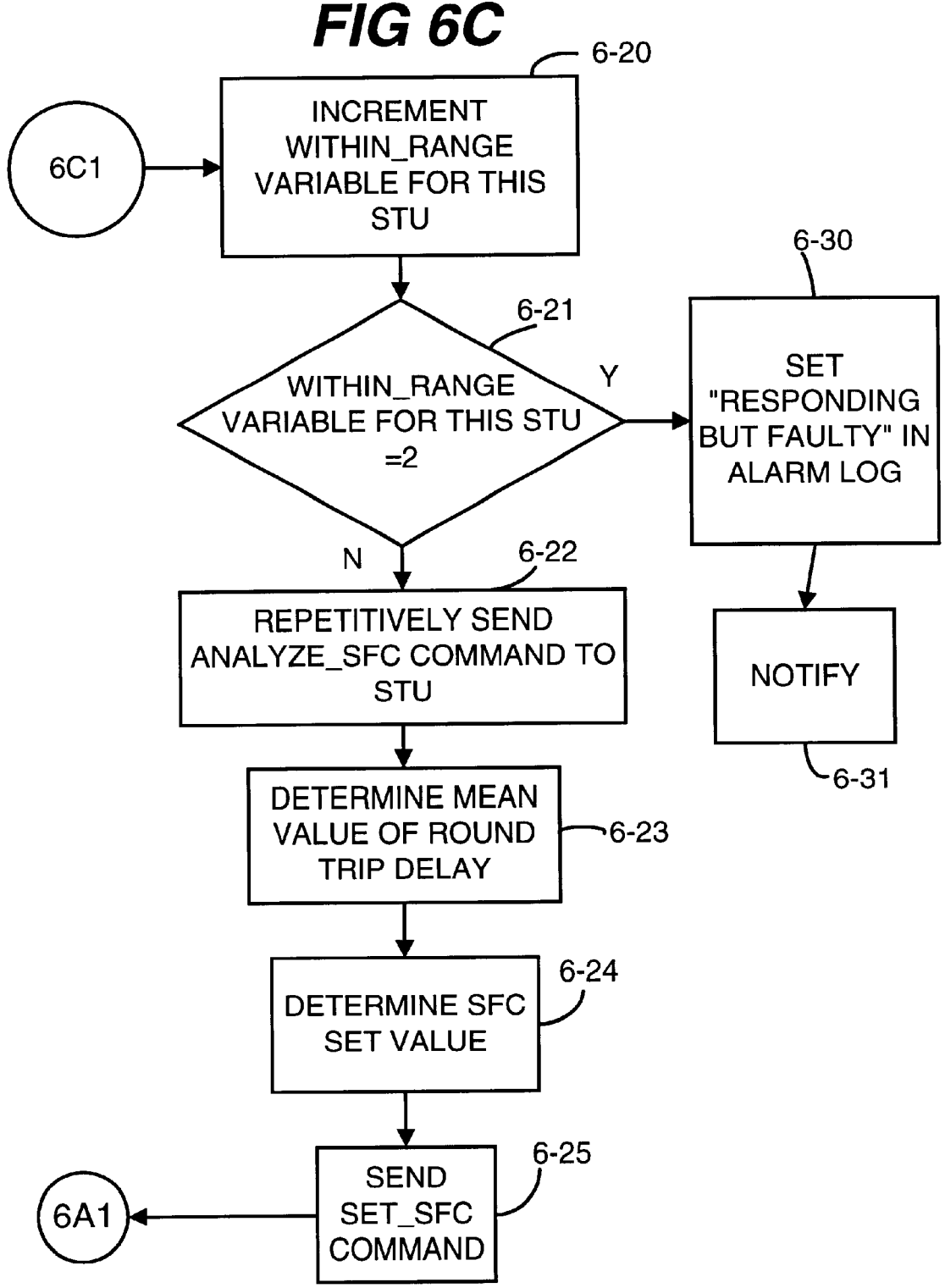

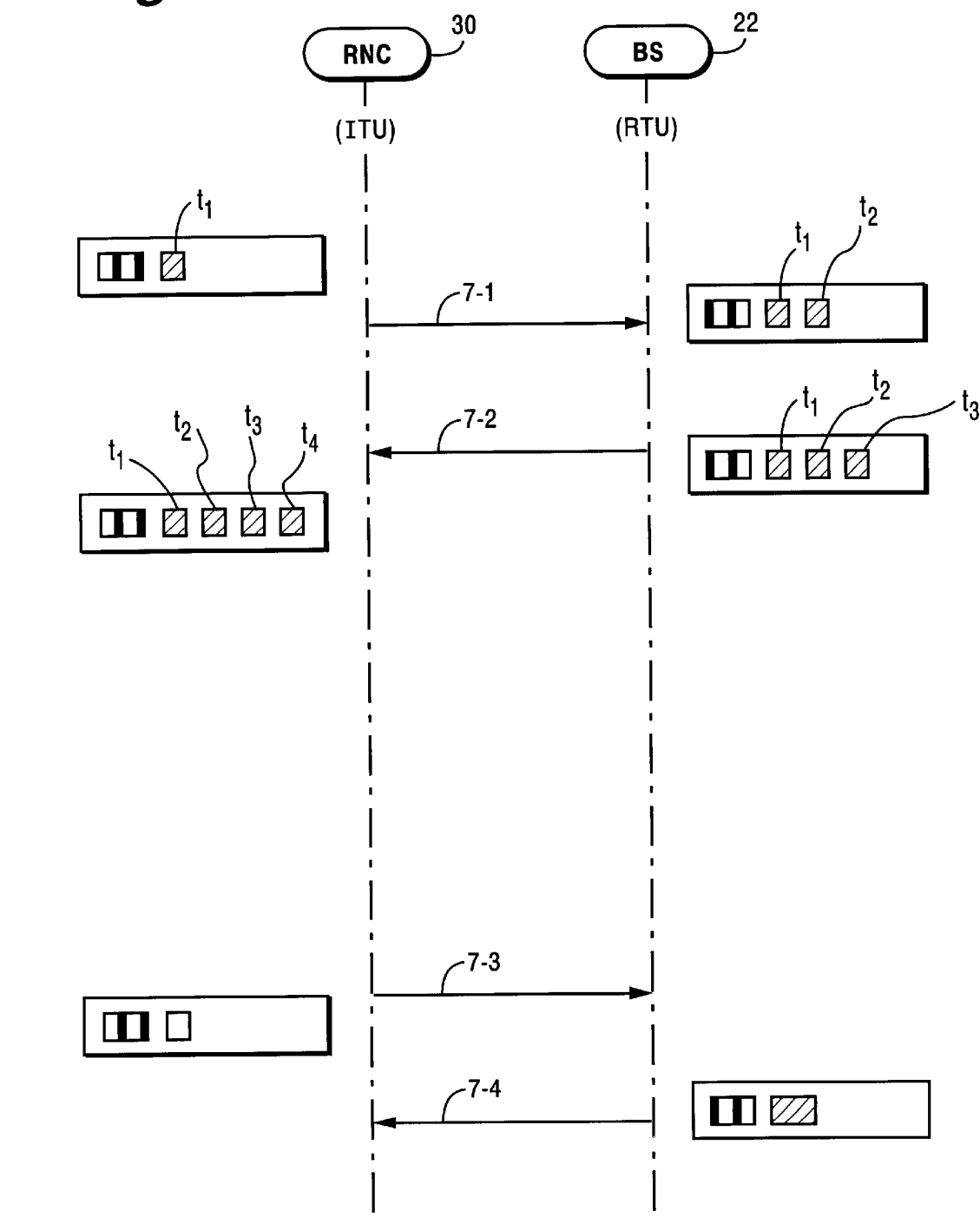

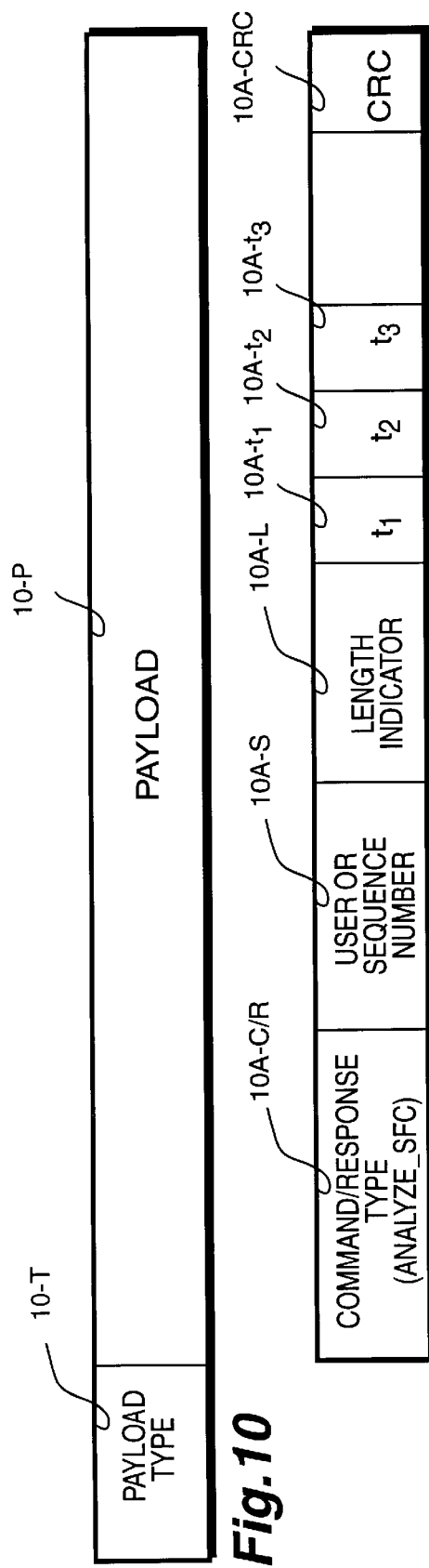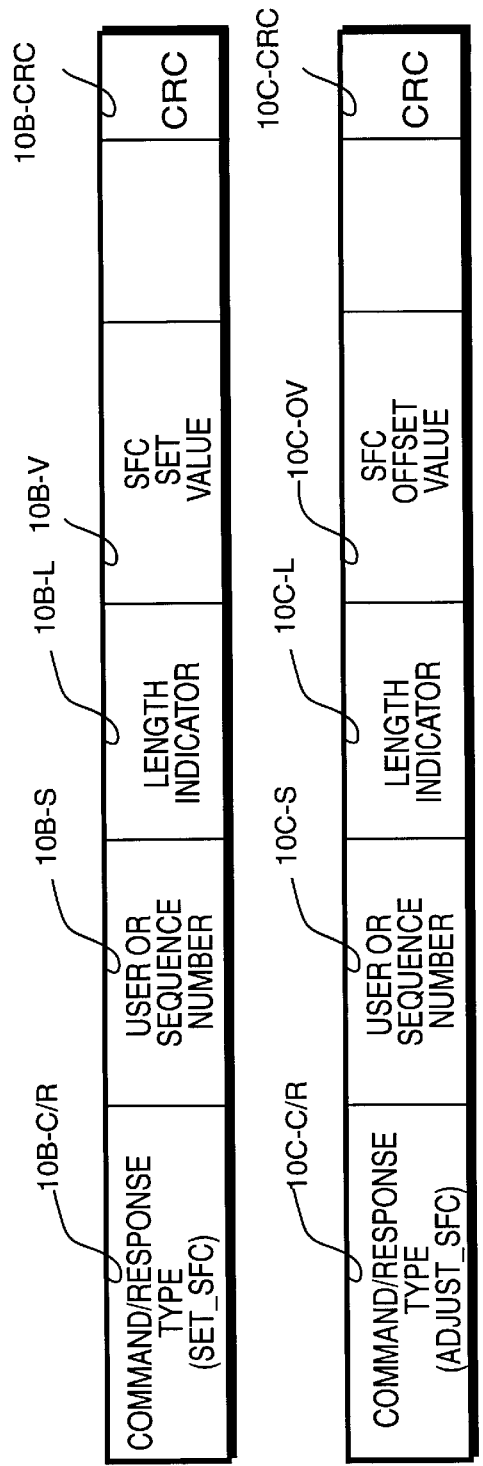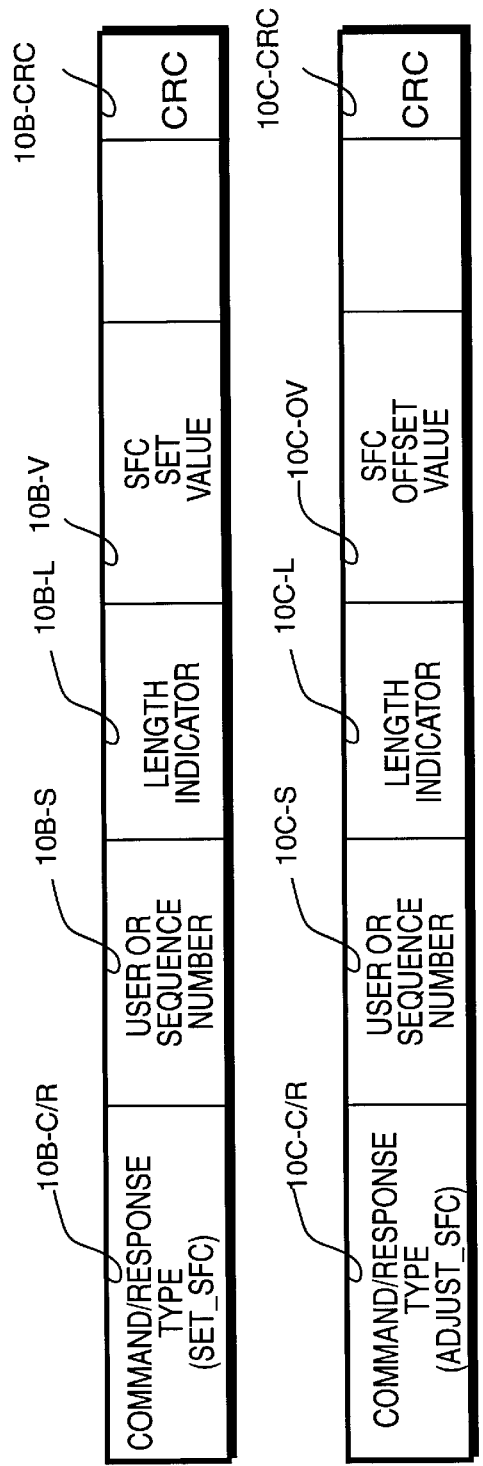
Fig. 10  Fig. 10A  Fig. 10B  Fig. 10C

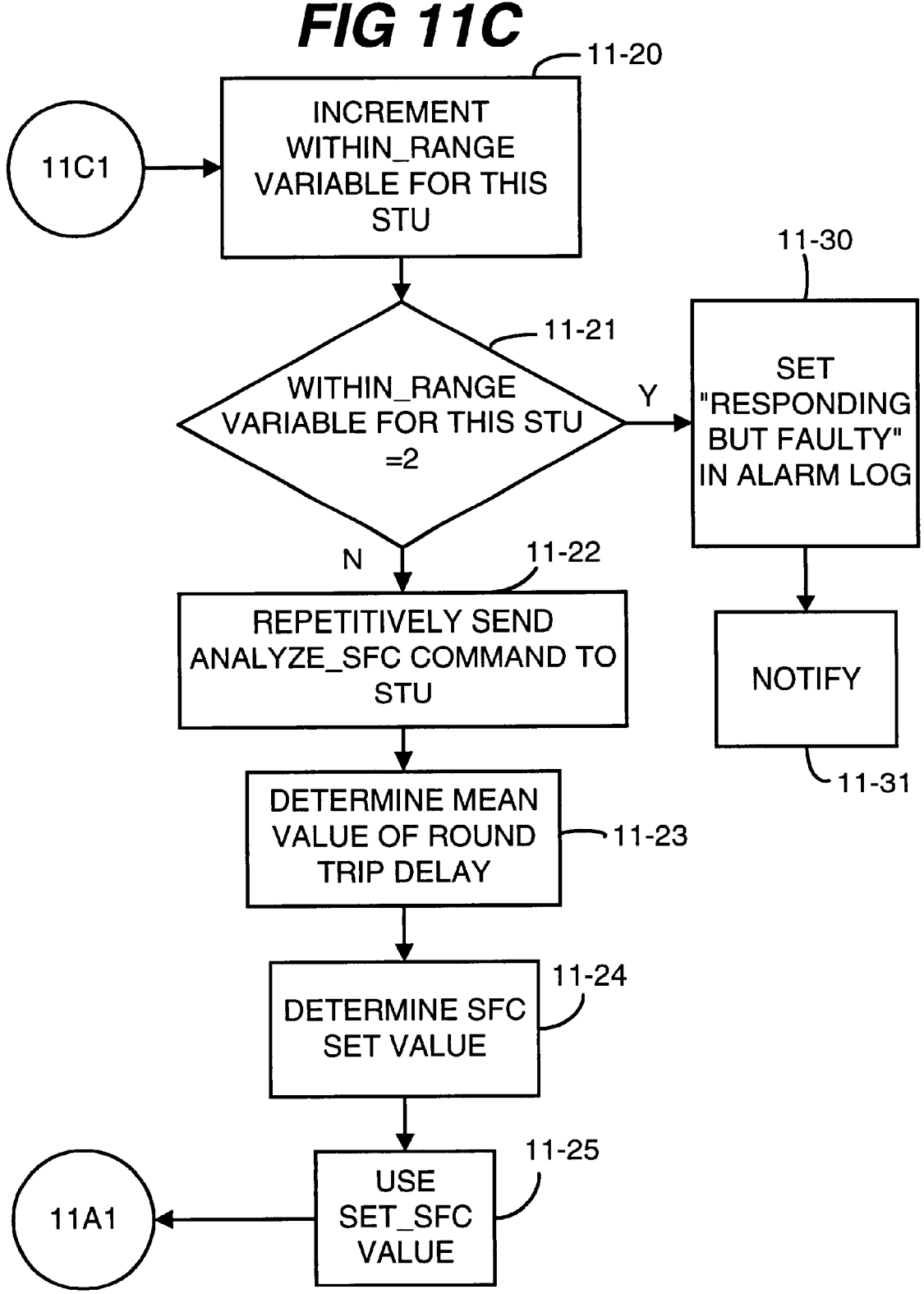

SYNCHRONIZATION FOR CELLULAR TELECOMMUNICATIONS NETWORK

This application claims the benefit and priority of U.S. Provisional Patent application Ser. No. 60/068,096 filed Dec. 19, 1997, entitled "SYNCHRONIZATION FOR CELLULAR TELECOMMUNICATIONS NETWORK", which is incorporated herein by reference.

BACKGROUND

1. Field of the Invention

The present invention pertains to cellular telecommunications, and particularly to synchronization of timing units located in a cellular network such as a code division multiple access (CDMA) cellular network, for example.

2. Related Art and Other Considerations

In mobile telecommunications, a mobile station such as mobile telephone communicates over radio channels with base stations. Typically a plurality of base stations are, in turn, ultimately connected by an upper node, such as a radio network controller (RNC), to a mobile switching center (SC). The mobile switching center (MSC) is usually connected, e.g., via a gateway, to other telecommunication networks, such as the public switched telephone network.

In a code division multiple access (CDMA) mobile telecommunications system, the information transmitted between a base station and a particular mobile station is modulated by a mathematical code (such as channelizing and scrambling codes) to distinguish it from information for other mobile stations which are utilizing the same radio frequency. Thus, in CDMA, the individual radio links are discriminated on the basis of codes. Various aspects of CDMA are set forth in Garg, Vijay K. et al., *Applications of CDMA in Wireless/Personal Communications,* Prentice Hall (1997).

In addition, in CDMA mobile communications, on the downlink typically the same baseband signal with suitable codes is sent from several base stations with overlapping coverage. In other words, frames with equal user data are sent from different base stations simultaneously on the downlink to the mobile station. The mobile terminal can thus receive and use signals from several base stations simultaneously. Moreover, since the radio environment changes rapidly, a mobile station likely has radio channels to several base stations at the same moment, e.g., so that the mobile station can select or combine the best channel and, if necessary, use signals directed to the mobile from various base stations in order to keep radio interference low and capacity high.

On the uplink, user data sent in frames from the mobile station for the mobile connection is received in multiple base stations. The mobile station transmits with the lowest power which is requested by one of the base stations. The base station that requires the lowest power can best "hear" the mobile station. However, while interference is kept low, which base station has the best quality reception of the signal of the mobile station may randomly change during the course of the connection. Therefore, an upper node such as radio network controller (RNC) selects best quality ones of comparably number frames received from the mobile station by the base stations.

This utilization of radio channels between multiple base stations and a mobile station in a CDMA scheme, as summarized above, is termed "soft handover."

The principles of diversity and soft-handover require that the base stations participating in a particular connection be synchronized relative to the upper node, e.g., to the radio network controller (RNC). Synchronization is required since, among other things, the plural base stations participating in a connection must send the same frame information at the same time to the mobile station involved in the connection.

Various techniques for obtaining synchronization between base stations and the upper node are described in U.S. Pat. No. 5,388,102 to Griffith et al. Such techniques include earth-orbiting satellite (e.g., utilizing the Global Positioning System [GPS]), a dedicated synchronization link, and interrupting synchronization signals on data links. GPS is used to obtain an absolute phase difference of (for example) 3 to 10 micro seconds (as occurs, for example, in IS-95). In other systems, it is sufficient if the base stations are synchronized with other phase differences (e.g., 2, 5, or 10 milliseconds) if the soft-handover procedure is assisted by the mobile station advising of the magnitude of the phase difference from a source to target base station (e.g., a mobile assisted handover, MAHO).

In U.S. Pat. No. 5,245,634 to Averbuch, loss of GPS causes a base station to send a synchronization message to a central site. The central site starts a measurement counter, and sends a master sequence to the base station. The base station then sends a return sequence. After M loops of such sequence with respective counting at both sites, the central site sends its measured round-trip time delay to the base station. The base station performs calculations (e.g., drift) and compensates for discrepancies in the round-trip time delay measurements by adjusting the base station local clock.

One way of identifying frames in the downlink (from the upper node to the base station) and the uplink (from the base station to the upper node) for a mobile connection is to attach a sequence number to each frame. These sequence numbers can, in the downlink, be correlated in the base stations against a base station reference timing/numbering order to align the frames so as to correct for intended transmission time (at the air interface). In the uplink, sequence numbers (related to the base station reference timing/numbering) are attached to frames from each base station before transfer of the frames to the upper node. At the upper node, frame combining/selection is performed based on these sequence numbers.

In some systems, the upper node (e.g., RNC) has a master system frame counter which is locked to an external reference or to a clock source. Some direct sequence CDMA systems (DS-CDMA) need a procedure capable of synchronizing base stations to have a frame level uncertainty of approximately plus or minus one millisecond relative to the upper node. In other words, the master frame counter of the upper node must be distributed to all base stations within a predetermined maximum time, e.g., approximately one millisecond.

For some mobile systems this degree of level uncertainty is necessary since the air interface (between the base station (s) and the mobile station) contains frames (of duration, for example, of ten milliseconds) with no frame number information. The mobile stations themselves cannot distinguish between such frames. Yet the mobile station must nevertheless know in what direction frames from the base station should be adjusted within plus or minus half the duration of the frames (e.g., five milliseconds).

In other systems in which the frame number is present on one of the channels, it is possible to have a phase difference of greater than half a frame. Such can occur in systems where the mobile station assists in measuring phase difference, in which case the channel upon which the phase difference measurement is performed may carry the frame number. This potential of greater than half a frame phase difference requires synchronization of base stations to a maximum phase difference with respect to an upper node (e.g., RNC).

What is needed therefore, and an object of the present invention, is an accurate and reliable technique for synchronizing timing units, such as timing units at base stations with an upper node.

BRIEF SUMMARY OF THE INVENTION

Synchronization is effected in a cellular telecommunications network between a master timing unit located at control node of the network and a slave timing unit. The slave timing unit can be located either at the control node or a controlled node of the network. In accomplishing the synchronization, an initiating one of the master timing unit and the slave timing unit transmits a synchronization analysis command message including a first parameter to a responding one of the master timing unit and the slave timing unit. In response, the responding timing unit sends a synchronization analysis response message which includes at least second parameter and preferably a third parameter to the initiating timing unit. The initiating timing unit uses e.g., parameters extracted from the synchronization analysis response message to determine a synchronization adjustment value for the slave timing unit. In an embodiment in which the initiating timing unit is the master timing unit, the master timing unit transmits the synchronization adjustment value in a synchronization adjustment command message to the slave timing unit. In an embodiment in which the initiating timing is the slave timing unit, the slave timing unit calculates and performs the adjustment by itself, and then notifies the master unit. The synchronization adjustment value is preferably a synchronization offset value.

The first parameter which is included in the synchronization analysis command message is preferably a first time stamp value $t_1$ related to the time that the synchronization analysis command message is transmitted from the initiating timing unit to the responding timing unit. The second parameter, inserted in the synchronization analysis response message by the responding timing unit, is a second time stamp value $t_2$ related to the time that the synchronization analysis command message is received at the responding timing unit. The third time stamp value $t_3$, also inserted in synchronization analysis response message by the responding timing unit, is related to the time that the synchronization analysis response message is sent from the responding timing unit. The initiating unit determines a fourth time stamp value $t_4$ indicative of a time of reception of the synchronization sequence response message at the initiating timing unit.

When the initiating unit is the master unit, the initiating timing unit determines the synchronization adjustment value by comparing the second parameter $t_2$ included in the synchronization analysis response message with a predicted second parameter $t_{2\text{-}predicted}$. The predicted second time stamp value $t_{2\text{-}predicted}$ is determined as $t_{2\text{-}predicted}=((t_1+t_4)/2)-((t_3-t_2)/2)$. The synchronization adjustment value is then determined as $t_{2\text{-}predicted}-t_2$.

When the initiating unit is the slave timing unit, the initiating timing unit determines the synchronization adjustment value by comparing the first parameter $t_1$ included in the synchronization analysis response message with a predicted first parameter $t_{1\text{-}predicted}$. The predicted first time stamp value $t_{1\text{-}predicted}$ is determined as $t_{1\text{-}predicted}=((t_2+t_3)/2)-((t_4-t_1)/2)$. The synchronization adjustment value is then determined as $t_{1\text{-}predicted}-t_1$.

The parameters $t_1$ through $t_4$ are preferably values of system frame counters. In particular, the parameters $t_1$ and $t_4$ are then-current values of a system frame counter of the initiating timing unit. The parameters $t_2$ and $t_3$ are then-current values of a system frame counter of the responding timing unit. The synchronization adjustment value is used to adjust the value of the system frame counter of the responding timing unit.

The master timing unit can be located in a control node such as e.g., a Radio Network Controller (RNC) [alias, Base Station Controller (BSC)] or even in a mobile switching center (MSC). The slave timing unit can be located in a base station node, or in the control node (such as in a diversity handover unit situated at the control node).

In one embodiment, the synchronization messages transmitted between the master timing unit and the slave timing unit are encapsulated in asynchronous transfer mode (ATM) cells in a code division multiple access (CDMA) cellular telecommunications network.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 6A, FIG. 6B, and FIG. 6C are flowcharts showing basic steps performed in accordance with a mode of the present invention in which a master timing unit serves as an initiating timing unit (ITU).

FIG. 7 is a diagrammatic view showing a sequence of synchronization messages transmitted in accordance with the mode of FIG. 6.

FIG. 10 is a diagrammatic view showing a format of a message sent between an initiating timing unit (ITU) and a responding timing unit (RTU) in accordance with the present invention.

FIG. 10A is a diagrammatic view showing a format of ANALYSE_SFC command and response messages utilized by the present invention.

FIG. 10B is a diagrammatic view showing a format of SET_SFC command and response messages utilized by the present invention.

FIG. 10C is a diagrammatic view showing a format of ADJUST_SFC command and response messages utilized by the present invention.

FIG. 11A, FIG. 11B, and FIG. 11C are flowcharts showing basic steps performed in accordance with a mode of the present invention in which a slave timing unit serves as an initiating timing unit (ITU).

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
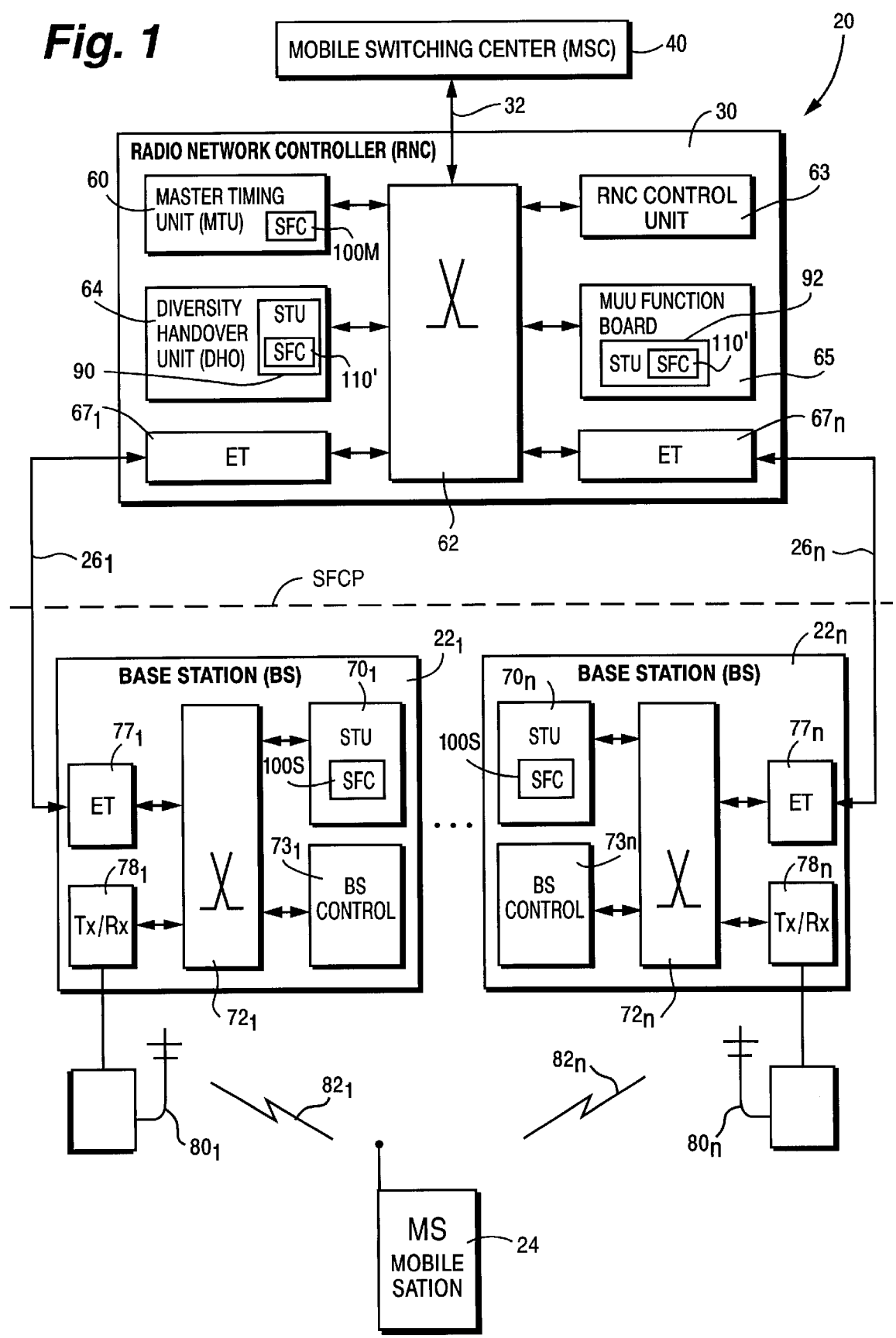
FIG. 1 is a schematic view of a cellular telecommunications network according to an embodiment of the invention.

FIG. 1 shows a cellular telecommunications system 20 which includes plural base stations $22_1$ through $22_n$ through which a mobile connection is established over the air interface with a mobile station 24. Base stations $22_1$ through $22_n$ are connected by landlines $26_1$ through $26_n$, respectively, to a radio network controller (RNC) 30. Radio network controller (RNC) is, in turn, connected by landline 32 to a mobile switching center (MSC) 40. The mobile switching center (MSC) 40 is usually connected, e.g., via a gateway, to other telecommunication networks, such as the public switched telephone network. The gateway is often implemented by using a Gateway MSC (GMSC), which houses the gateway.

Base stations $22_1$ through $22_n$, radio network controller (RNC) 30, and mobile switching center (MSC) 40 are each considered to be "nodes" of cellular telecommunications system 20. Radio network controller (RNC) 30 is particularly considered to be a control node or "upper"node for base stations $22_1$ through $22_n$, while base stations $22_1$ through $22_n$ are considered to be "controlled" nodes relative to radio network controller (RNC) 30. Radio network controller (RNC) 30 can be a node sometimes referred to as a base station controller (BSC).

Radio network controller (RNC) 30 has a master timing unit (MTU) 60 which is utilized to establish synchronization with a plurality of slave timing units (STUs). As exemplified hereinafter, a slave timing unit is provided in each of base stations $22_1$ through $22_n$, as well as in various components of radio network controller (RNC) 30. In the illustrated embodiment, master timing unit (MTU) 60 and the slave timing units (STUs) in base stations $22_1$ through $22_n$ are provided on dedicated circuit boards known as timing unit boards (TUBs). Slave timing units situated at radio network controller (RNC) 30 are provided on multipurpose circuit boards (AMBs).

In the particular embodiment shown in FIG. 1, both radio network controller (RNC) 30 and base stations $22_1$ trough $22_n$ are nodes which utilize Asynchronous Transfer Mode (ATM) cells. In this regard, radio network controller (RNC) 30 has an ATM switch core 62. ATM switch core 62 has a plurality of switch core ports which are connected to corresponding circuit boards. In addition to the circuit board upon which master timing unit (MTU) 60 resides, ATM switch core 62 is connected via its respective switch core ports to circuit boards hosting an RNC control unit 63; a diversity handover unit (DHO) 64; a multifunction board 65; and a plurality of extension terminals (ETs) $67_1$–$67_n$.

The extension terminals (ETs) $67_1$–$67_n$ of radio network controller (RNC) 30 are utilized to form ATM connections over landlines or links $26_1$ through $26_n$, respectively, to base stations $22_1$ through $22_n$. All ATM-based nodes of the illustrative network 20 of FIG. 1 are connected to other ATM-based nodes over ATM links. These ATM links are terminated in an extension terminal (ET) in each node. Thus, although not shown as such, link 32 from mobile switching center (MSC) 40 is terminated in an extension terminal of radio network controller (RNC) 30.

The ATM-based base stations $22_1$ through $22_n$ each have slave timing units (STUs) $70_1$ through $70_n$ which are connected to base station ATM switch cores $72_1$ through $72_n$, respectively. Each base station (BS) 22 has a base station controller 73 provided on a circuit board which connects to a port of its corresponding ATM switch core 72. As mentioned before, each base station 22 is connected to radio network controller (RNC) 30 by a landline 26, the landline 26 being terminated in an exchange terminal (ET) 77 of base station 22. In addition, each base station (BS) 22 has one or more transceiver boards 78 connected to its ATM switch core 72. For simplicity, each of base stations $22_1$ through $22_n$ is shown as having one transceiver board 78, but more than one transceiver board 78 is likely provided for each base station (BS) 22. Each transceiver board 78 is connected to an appropriate antenna 80. Thus, in FIG. 1, a connection with mobile station (MS) 24 involving base stations $22_1$ through $22_n$ includes air links $82_1$ through $82_n$ between mobile station (MS) 24 and antennae $80_1$ through $80_n$, respectively.

The illustrated network 20 of FIG. 1 is a code division multiple access (CDMA) network which employs diversity or soft handover. In this regard, on the uplink from mobile station (MS) 24 to radio network controller (RNC) 30, frames having same user data are received at each of base stations $22_1$ through $22_n$ through which the mobile connection is established, although using differing code channels over the respective air links $82_1$ through $82_n$. The frames received at each base station (BS) 22 are given a certain quality rating and a system frame count value. The system frame count value is assigned by the slave timing unit (STU) 70 of base station (BS) 22. The frame, together with its quality rating and system frame count value, is encapsulated in an ATM cell. The frame-bearing ATM cells are routed through the exchange terminal 77 of the base station 22 and over link 26 to radio network controller (RNC) 30.

At radio network controller (RNC) 30, the frame-bearing ATM cells are received at the corresponding exchange terminal (ET) 67, and are routed through ATM switch core 62 to diversity handover unit (DHO) 64, At diversity handover unit (DHO) 64, frames containing the same user data from each of base stations $22_1$ through $22_n$ are combined or selected, so that the frames having the best quality are ultimately forwarded (through ATM switch core 62) to mobile switching center (MSC) 40. The mobile switching center (MSC) 40 has different service adaptation devices, for example a coder-decoder for voice or other adaptation devices for packet data and circuit data.

As indicated above, in the radio network controller (RNC) 30 frames from differing base stations (BSs) 22 are assessed as having the same user data if the frames have the same system frame counter value. Hence, it is important that the slave timing units (STUs) of the differing base stations $22_1$ through $22_n$ be synchronized relative to radio network controller (RNC) 30 so that they will accord the same system frame counter value to like frames of user data.

The present invention addresses, e.g, the synchronization of master timing unit (MTU) 60 of radio network controller (RNC) 30 with the slave timing units (STUs) 70 of the base station (BS) 22. In addition, synchronization of other slave timing units, such as slave timing units residing at radio network controller (RNC) 30, is also provided. Moreover, the present invention also encompasses other situations, such as a lateral hierarchial situation in which the timing unit of one radio network controller (RNC) is designated as a master, and the timing unit of another radio network controller (RNC) is designated as a slave.

On the downlink from radio network controller (RNC) 30 to a base station (BS) 22, frames of user data received from mobile switching center (MSC) 40 are routed through ATM switch core 62 of radio network controller (RNC) 30 to diversity handover unit (DHO) 64. At diversity handover unit (DHO) 64, a frame splitter essentially provides a copy of each frame to each of base stations $22_1$ through $22_n$ participating in the mobile connection with mobile station (MS) 24. All copies of the a frame on the downlink are provided with the same system frame counter value. On the downlink, the system frame counter value is assigned by a slave timing unit (STU) 90 which resides in diversity handover unit (DHO) 64 of radio network controller (RNC) 30.

The copies of the frames generated by the frame splitter of diversity handover unit (DHO) 64 are routed through switch core 62 to the respective extension terminal (ET) 67, for application on the appropriate link 26 to the destination base station (BS) 22. At the base station (BS) 22 the frame copy is received by the extension terminal 77 and routed through switch core 72 ultimately to transceiver board 78 for application over the air interface. However, the time at which the frame copy is applied to the air interface is dependent upon the value of the system frame counter value relative to a current system frame counter value maintained by slave timing unit 70 for that base station (BS) 22.

From the foregoing, it will be seen that also on the downlink the synchronization of base stations $22_1$ through $22_n$ relative to master timing unit (MTU) 60 is important. Moreover, since the system frame counter value borne by a frame copy on the downlink is assigned by the slave timing unit (STU) 90 of diversity handovrer unit (DHO) 64, synchronization of slave timing unit (STU) 90 relative to master timing unit (MTU) 60 is also important.

Additional details of diversity and soft handover are provided e.g., by U.S. patent application Ser. No. 08/979,866 filed Nov. 26, 1997, entitled "Multistage Diversity Handling for CDMA Mobile Telecommunications", and U.S. patent application Ser. No. 08/980,013 filed Nov. 26, 1997, entitled "Diversity Handling Moveover for CDMA Mobile Telecommunications", both of which are incorporated herein by reference.

Figure 2:
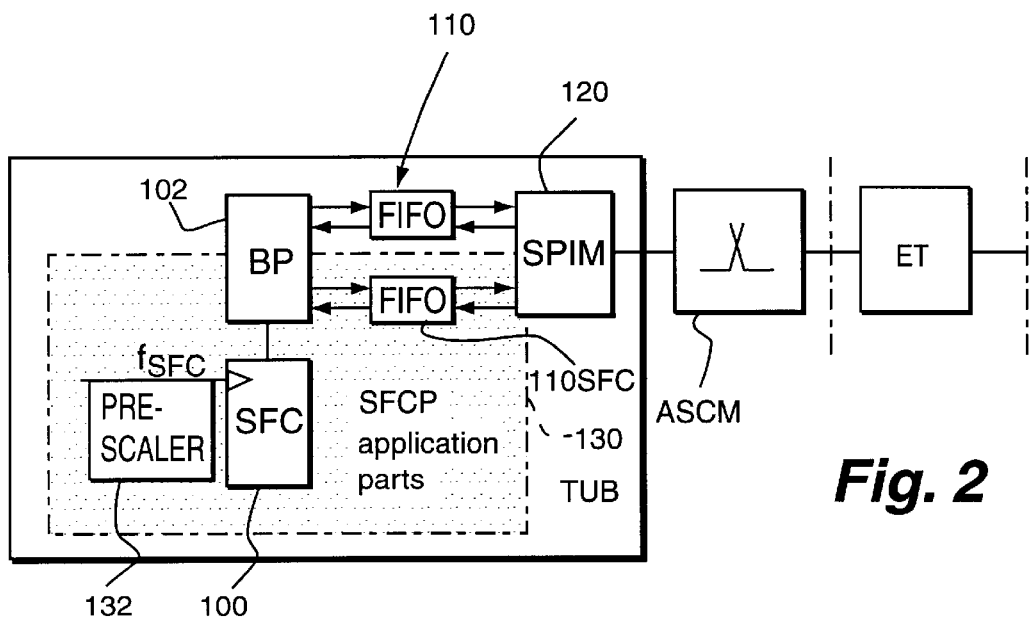
FIG. 2 is a schematic view of a portion of a node having a timing unit of an embodiment of the invention located on a timing board.

Since synchronization of the slave timing units (STUs) with master timing unit (MTU) 60 is so important, details of these respective timing units are now discussed. In this regard, FIG. 2 shows a timing unit board (TUB) relative to a switch core and an extension terminal (ET) of a node. The timing unit board (TUB) can be either for master timing unit (MTU) 60 of radio network controller (RNC) 30, or for a slave timing unit (STU) 70 situated at a base station (BS) 22.

The timing unit board (TUB) of FIG. 2 features a system frame counter (SFC) 100. In the illustrated embodiment, system frame counter (SFC) 100 is implemented in hardware, although the implementation alternatively may be at least in part accomplished using a board processor (BP) 102, e.g., a microprocessor. Board processor (BP) 102 is connected through a set 110 of bidirectional FIFO hardware circuits (e.g., buffers) to a switch port interface module (SPIM) 120 to the switch core ASCM. One of the FIFO buffers in set 110, particularly FIFO buffer 110SFC, is a hardware circuit which supports SFCP message handling of processor (BP) 102, and is dedicated for handling synchronization messages (as hereinafter discussed) between timing unit board (TUB) and other timing units of the network 20. Switch port interface module (SPIM) 120 is, in turn, connected to the appropriate switch core port of switch core ASCM.

A system frame counter-related portion 130 of timing unit board (TUB) thus includes not only system frame counter (SFC) 100, but also portions of board processor (BP) 102, the dedicated FIFO buffer 110SFC, and a prescaler 132. System frame counter (SFC) 100 and prescaler 132 are shown in more detail in FIG. 2A. Therein, system frame counter (SFC) 100 is shown as comprising both a frame fractional counter (FFC) 136 and a frame counter (FRC) 138.

System frame counter (SFC) 100 is the air-interface related frame counter employed in network 20. In the illustrated embodiment, the air frames are of 10 millisecond length. In the CDMA environment of the present illustration, system frame counter (SFC) 100 has a resolution down to one chip. System frame counter (SFC) 100 is forty one bits long in the illustrated embodiment. Of these forty one bits, sixteen bits are provided by frame fractional counter (FFC) 136 and twenty five bits are provided by frame counter (FRC) 138.

Frame fractional counter (FFC) 136 counts frame fractional resolution increments up to one 10 millisecond frame in the illustrated embodiment. Frame counter (FRC) 138 counts air interface related frames from zero to 255 (representing 10 millisecond frames, modulo 256). The frame fractional resolution is thus the same as the resolution of frame fractional counter (FFC) 136. If the resolution of system frame counter (SFC) 100 is one chip in the 4.096 Mcps (Mega chip per second) domain, frame fractional counter (FFC) 136 counts from 0 to 40,959.

In the illustrated embodiment, frame counter (FRC) 138 counts 10 millisecond frames. As noted above, in the illustrated embodiment frame counter (FRC) 138 has a length of $2^{25}$, i.e., frame counter (FRC) 138 is a binary twenty five bit counter or a 33,554,432 counter. Frame counter (FRC) 138 counts 10 millisecond frames and counts from zero to 33,554,432 (which corresponds to 93 hours, 12 minutes, and 24.32 seconds).

Prescaler 132 is employed to obtain the desired resolution of system frame counter (SFC) 100. A higher over-sampling related clock is often available as the clocking source for system frame counter (SFC) 100. The prescaler 132 is the difference between the over-sampling related clock and the desired resolution of system frame counter (SFC) 100. For example, in the illustrated embodiment (see FIG. 2A) the clocking source has a frequency of 32.768 MHz, which is scaled by a factor of eight by prescaler 132 to obtain the desired clock frequency of 4.096 MHz which is input to system frame counter (SFC) 100.

Figure 2A:
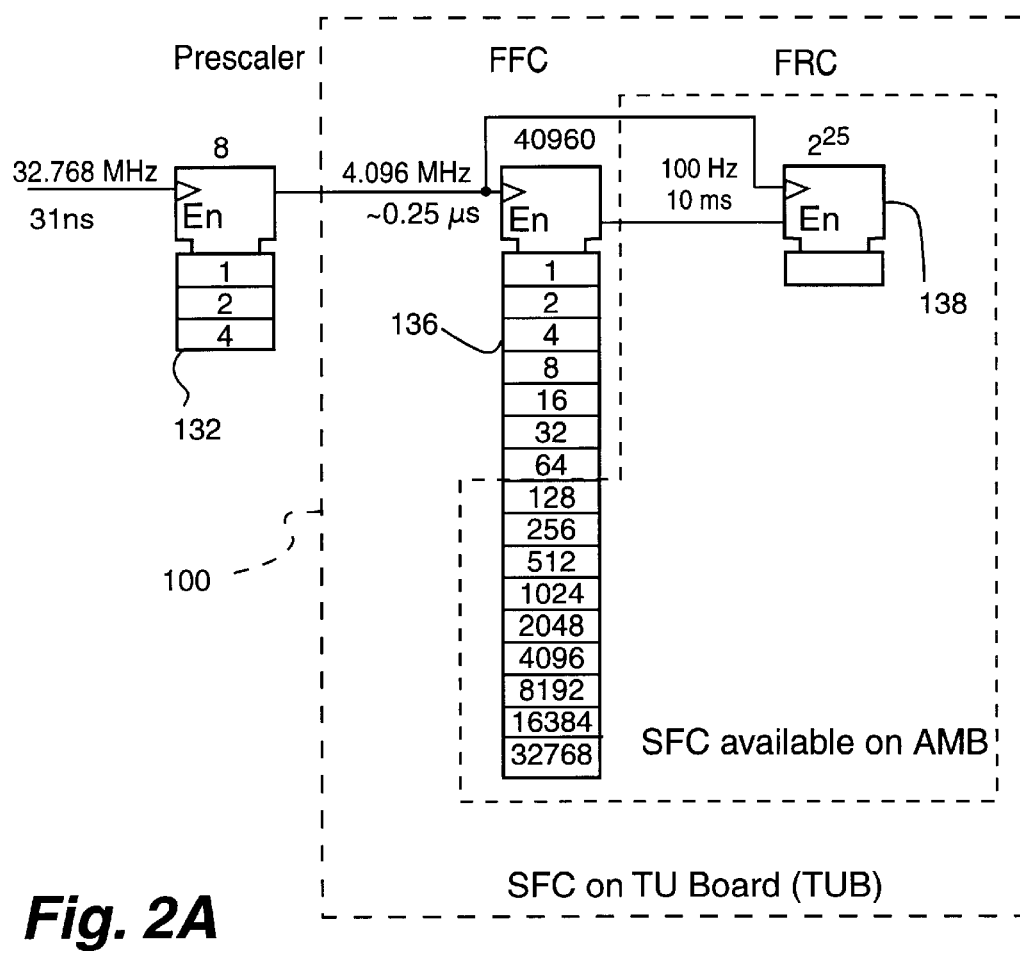
FIG. 2A is a schematic view of a part of an synchronization frame counter portion of the timing unit of FIG. 2.

Although the structure of FIG. 2 and FIG. 2A pertaining to the present invention is common for all timing unit boards (TUBs) including both master timing unit (MTU) 60 and slave timing units (STUs) 70, for sake of clarity in FIG. 1 the SFC for master timing unit (MTU) 60 has been labeled as system frame counter (SFC) 100M and the SFC for slave timing units (STUs) 70 have been labeled as system frame counter (SFC) 100S.

It should be understood that the example discussed above having air frames of 10 millisecond in length, a resolution of one chip, and system frame counter (SFC) 100 being forty one bits long, is merely illustrative. Other systems having other values are also within the scope of the present invention, such as (for example) a system having 20 millisecond frame length, four chips, and a twenty six bit system frame counter (SFC).

As mentioned previously, slave timing units (STUs) can be provided on boards which are not dedicated timing unit boards (TUBs). One example mentioned above is slave timing unit (STU) 90 of diversity handover unit (DHO) 64 of radio network controller (RNC) 30.

Figure 3:
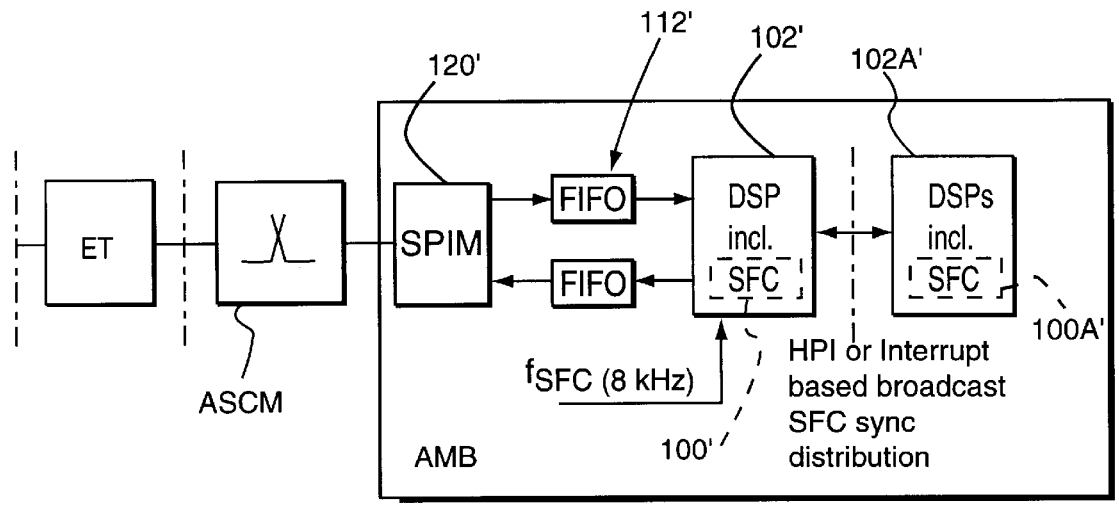
FIG. 3 a schematic view of a portion of a node having a timing unit of an embodiment of the invention located on a board other than a timing board.

FIG. 3 shows the location of system frame counter (SFC) 100' on a board (AMB) which is not a dedicated timing unit board (TUB). In particular, system frame counter (SFC) 100' is included in a digital signal processor 102' mounted on the board AMB. Digital signal processor 102' is connected through a pair 112' of unidirectional FIFO buffers to switch port interface module 120'. As in the case of FIG. 2, switch port interface module 120' is connected to an appropriate one of the ports of the switch core ASCM.

As indicated in FIG. 3, there may be digital signal processors other than DSP 102' on board AMB, such as digital signal processor 102A'. Further, these other digital signal processors may have their own slave timing units, as indicated by system frame counter (SFC) 100A'. The digital signal processors 102', 102A', etc. on board AMB can be connected by any of various means including use of interrupt-driven communications, by which the synchronization messages of the present invention may be broadcast. For example, plural DSPs 102A' may be provided, with DSP 102' serving as a router DSP to route packets between SPIM 120' and the plural DSPs 102A'.

Figure 3A:
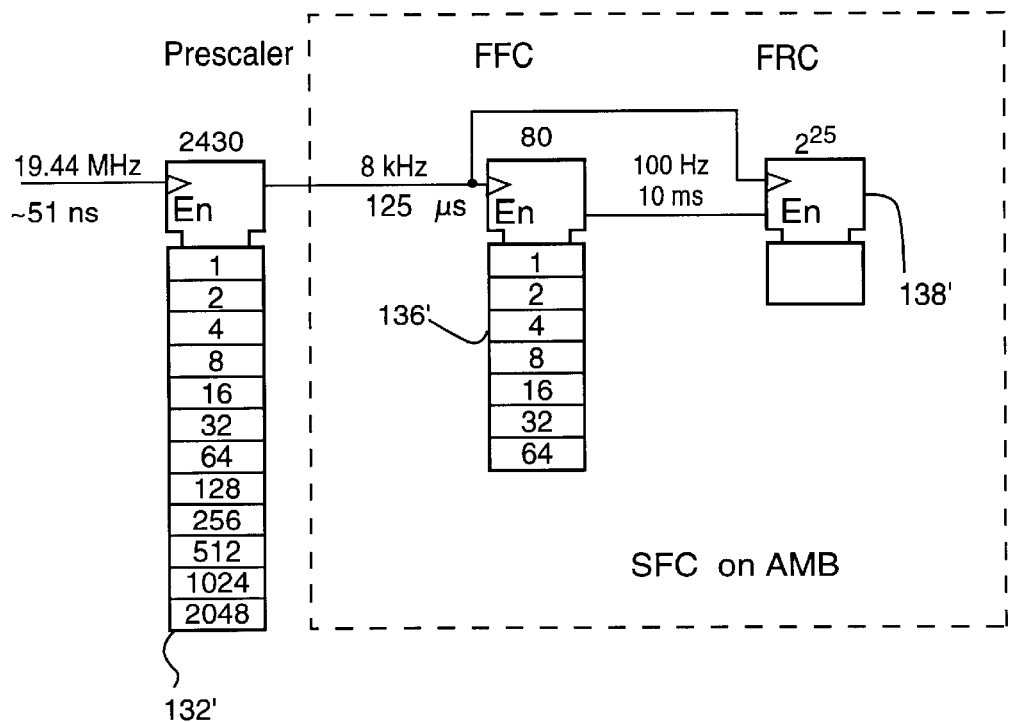
FIG. 3A is a schematic view of a part of an synchronization frame counter portion of the timing unit of FIG. 3.

System frame counter (SFC) 100' of the type on multifunction boards such as board AMB of FIG. 3 is shown in more detail in FIG. 3A. As in the case of system frame counter (SFC) 100 of FIG. 2A, system frame counter (SFC) 100' of FIG. 3A includes a frame fractional counter (FFC) and a frame counter (FRC) which work in conjunction with a prescaler. In view of the fact that these elements have differing sizes but similar functions to similarly named elements of FIG. 2, the prescaler of FIG. 3A is denominated as prescaler 132', the frame fractional counter (FFC) of FIG. 3A as frame fractional counter (FFC) 136', and the frame counter (FRC) of FIG. 3A as frame counter (FRC) 138'.

The system frame counter (SFC) 100' of FIG. 3A is clocked with an 8 kHz clock, which is scaled by prescaler 132' from a 19.44 MHz clock source on board AMB. Thus, prescaler 132' divides the 19.44 MHz clock by 2430. The frame fractional counter (FFC) 136' is a seven bit counter, counting from zero to seventy nine. As in FIG. 2A, frame counter (FRC) 138 is a twenty-five bit counter, counting a predetermined number of frames (e.g., $2^{26}$ frames), each frame being 10 milliseconds long.

Figure 4:
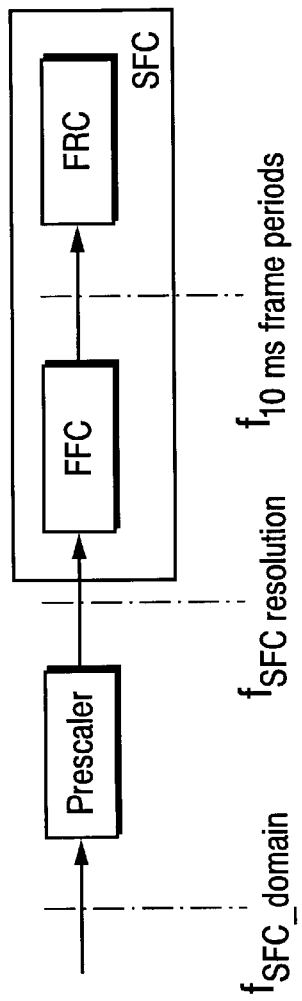
FIG. 4 is a schematic view of a synchronization frame counter portion of a generic timing unit.

Summarizing FIG. 2 and FIG. 2A which show a timing unit board (TUB)-borne system frame counter (SFC) 100 on the one hand, and FIG. 3 and FIG. 3A which show a multifunction board (AMB)-borne system frame counter (SFC) 100' on the other hand, a generic system frame counter (SFC) is shown in FIG. 4 as including both a frame fractional counter (FFC) and a frame counter (FRC). The system frame counter (SFC) works in conjunction with a prescaler, as discussed above.

The circuit topology provided in FIG. 2 and FIG. 3, with the SFC portions configured to maintain continuity in the receiving and transmitting sequence, preferably keeps the processing time between certain parameters (hereinafter denominated as $t_2$ and $t_3$) at zero. This simplifies software in the board processor 102.

Figure 5:
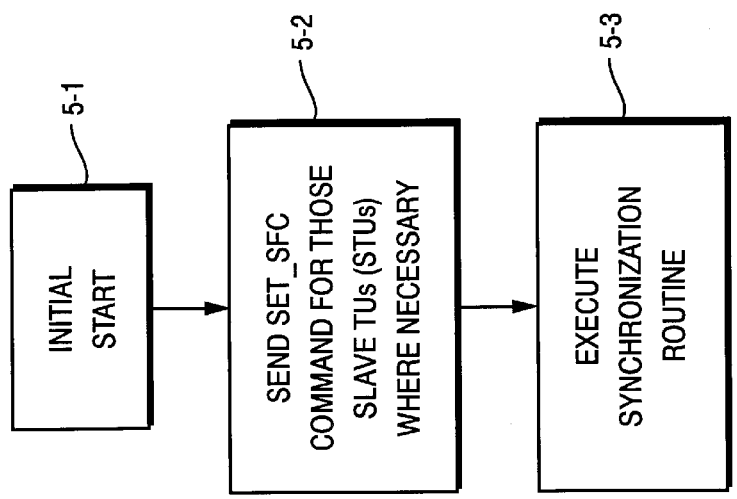
FIG. 5 is a flowchart showing basic initial steps performed by a master timing unit for accomplishing a mode of the present invention.

FIG. 5 depicts basic preliminary steps of the present invention as executed by master timing unit (MTU) 60. In particular, at step 5-1, master timing unit (MTU) 60 conducts initial start operations. These initial start operations include obtaining a list of service access points (SAPs), each leading to a slave timing unit controlled by master timing unit (MTU) 60. The list of SAPs provides corresponding ATM permanent virtual circuit (PVC) between master timing unit (MTU) 60 and each STU controlled by the master timing unit (MTU) 60.

For some slave timing units (STUs) it may be necessary to pre-set the value in the system frame counter (SFC). To this end, step 5-2 shows master timing unit (MTU) 60 sending a SET_SFC command message for the slave timing units (STUs) for which such pre-setting is necessary.

The SET_SFC command message is an example of just one type of synchronization message that is transmitted between master timing unit (MTU) 60 and the various slave timing units (STUs) controlled by master timing unit (MTU) 60. The general format of synchronization messages transmitted between master timing unit (MTU) 60 and its slave timing units (STUs) is depicted in FIG. 10. As shown in FIG. 10, a synchronization message of the present invention includes a payload type field 10-T and a payload 10-P. In the ATM-based illustrated embodiment, the synchronization messages of the present invention are each encapsulated in an ATM cell. For example, the synchronization messages can be encapsulated using ATM AAL5 protocol on plesiosynchronous digital hierarchial (PDH) links. The header of the ATM cell (in particular the VPI/VCI) is used for determining to what address, e.g., to which slave timing unit (STU), the cell is addressed. The particular virtual connection (VC) upon which the synchronization message is carried can be the same virtual connection as is used for carrying quality of service information for user data and signaling, or alternatively an ordinary virtual connection, in either case it being assured that the delay and delay variation is similar in both transmission directions.

The payload type field 10-T indicates whether the message concerns one of the following operations: (1) a SFC set value operation (e.g., the SET_SFC command message or a SET_SFC response message); (2) a SFC analysis operation (either an ANALYZE_SFC command message or an ANALYZE_SFC response message); or (3) an SFC adjustment operation (either an ADJUST_SFC command message or an ADJUST_SFC response message).

The format of the payload of the SET_SFC command message mentioned in connection with step 5-2 is shown in FIG. 10B. The payload of the SET_SFC command message includes a field 10B-C/R which indicates whether the message is a command or response (which for a SET_SFC command message will have a value indicative of a command rather than a response). The payload of the SET_SFC command message further includes a user sequence number field 10B-S; a payload length indicator field 10B-L; a SFC set value field 10B-V; and a payload CRC field (field 10B-CRC). It is the SFC set value field 10B-V which contains the value which is to be loaded into the system frame counter (SFC) of the addressed slave timing unit (STU) for a SFC set value operation as shown in step 5-2.

The formats of other synchronization messages employed by the present invention are discussed below as they are encountered in connection with the descriptions of FIG. 6 and FIG. 7.

The synchronization procedure of the present invention can be initiated by either a slave timing unit (STU) or by master timing unit (MTU) 60. Whichever timing unit initiates the synchronization procedure of the invention is referred to as the "initiating timing unit (ITU)", with the other timing unit being called the "responding timing unit (RTU)". In a first mode of the invention, the master timing unit (MTU) 60 functions as the initiating timing unit (ITU).

Block 5-3 of FIG. 5 represents general steps or operations which are performed by master timing unit (MTU) 60 in connection a synchronizing routine of the present invention. In some sense, the steps or operations of the synchronizing routine of step 5-3 of FIG. 5 can be conceptualized as being executed separately for each slave timing unit (STU) controlled by master timing unit (MTU) 60. As explained below, if master timing unit (MTU) 60 is an initiating timing unit (ITU), steps such as those shown in FIG. 6A, FIG. 6B, and FIG. 6C are performed as part of step 5-3 of FIG. 5. On the other hand, when master timing unit (MTU) 60 is a responding timing unit (RTU), step 5-3 is understood with respect to the actions depicted in FIG. 8.

Figure 8:
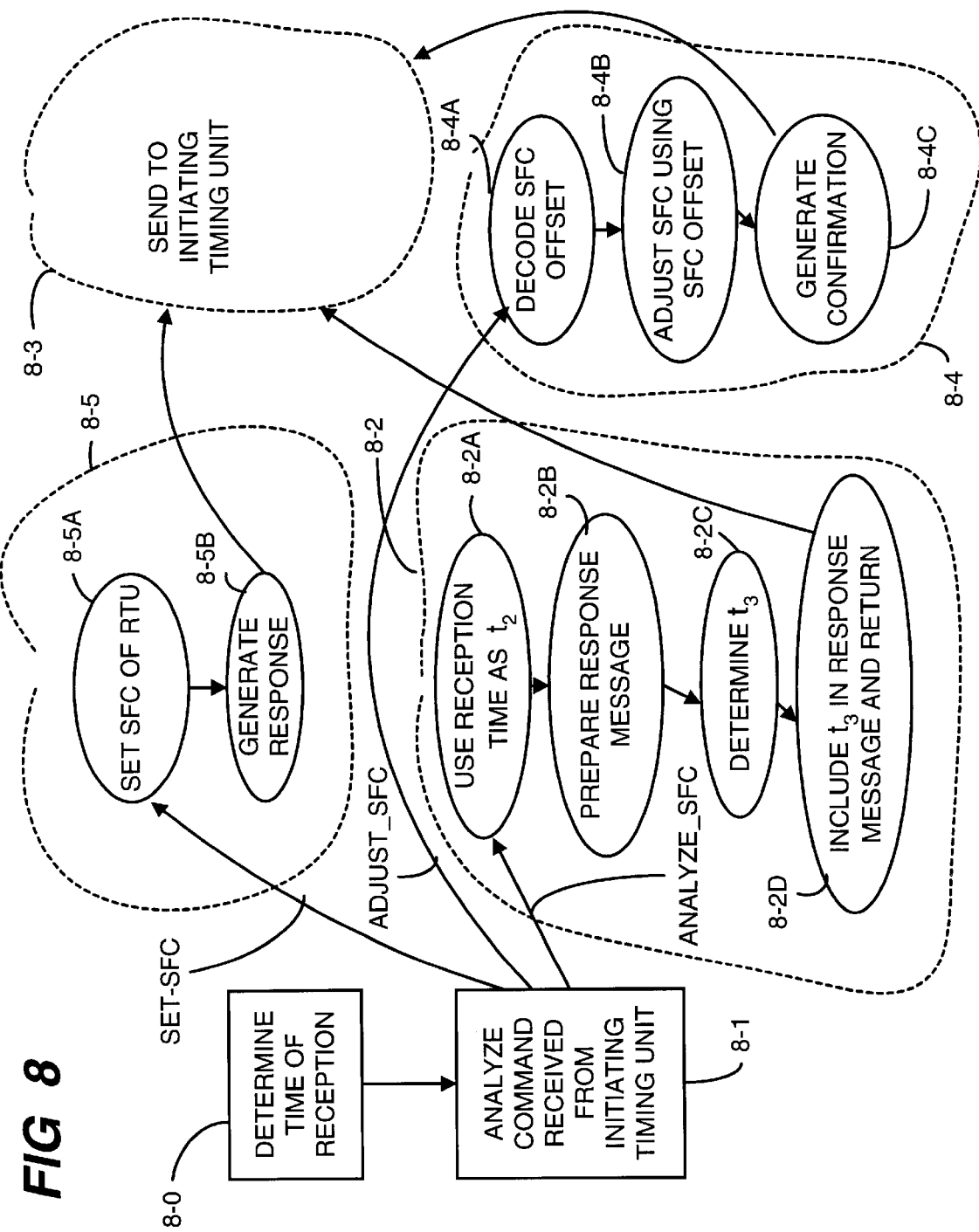
FIG. 8 is a state diagram showing events performed by a responding timing unit (RTU) in accordance with the present invention.

The general steps or operations executed in a first mode of the synchronizing operation of the invention are shown in FIG. 6A, FIG. 6B, and FIG. 6C. In this first mode, it will be recalled, the initiating timing unit (ITU) is the master timing unit (MTU) 60). When master timing unit (MTU) 60 is the initiating timing unit (ITU), the steps of FIG. 6A, FIG. 6B, and FIG. 6C show the details of block 5-3 as performed for each slave timing unit (STU). Responsive actions performed by the responding timing unit (RTU) which is addressed by the initiating timing unit (ITU) are shown in FIG. 8.

FIG. 7 also pertains to the first mode of the invention in showing an exemplary interchange of synchronization messages between master timing unit (MTU) 60 and a slave timing unit (STU). Reference is again made to FIG. 10 and FIG. 10A–FIG. 10C for the format of the synchronization messages.

After starting (see step 6-0 of FIG. 6A), master timing unit (MTU) 60 sends an ANALYZE_SFC command message to the slave timing unit (STU) [step 6-1] when requested to do so. The request to send an ANALYZE_SFC command message can be periodic or aperiodic as desired, and can occur as a result of a system parameter set up by an operator configuring when and how often the analyzing commands are to be issued.

The format of the payload of the ANALYZE_SFC command message is shown in FIG. 10A. Like the SET_SFC command message discussed earlier with reference to FIG. 10B, the payload of the ANALYZE_SFC command message includes a field 10A-C/R which indicates whether the message is a command or response, a user or sequence number field 10A-S; a payload length indicator field 10A-L; and a payload CRC field (field 10A-CRC). In addition, the ANALYZE_SFC command message includes a plurality of fields 10A-$t_1$, 10A-$t_2$, 10A-$t_3$ which are used to store certain synchronization-related parameters $t_1$, $t_2$, $t_3$, e.g., time-dependent values of the system frame counter (SFC) for either master timing unit (MTU) 60 or the addressed slave timing unit (STU). As seen below, these synchronization-related parameters $t_1$, $t_2$, $t_3$ essentially serve as time stamps carried by the ANALYZE_SFC command message and the ANALYZE_SFC response message.

When master timing unit (MTU) 60 is requested to send a ANALYZE_SFC command message to an addressed slave timing unit (STU), master timing unit (MTU) 60 inserts into the field 10A-$t_1$ of the ANALYZE_SFC command message the value of its system frame counter (SFC) 100 at the time the ANALYZE_SFC command message is sent to the addressed slave timing unit (STU). This inserted value of the system frame counter (SFC) 100 of master timing unit (MTU) 60 is represented by $t_1$.

FIG. 7, which presumes the initiating timing unit (ITU) to be the master timing unit (MTU) 60, shows as action 7-1 the transmission of an ANALYZE_SFC command message from master timing unit (MTU) 60 of radio network controller (RNC) 30 to an addressed slave timing unit (STU). In the illustration of FIG. 7, the addressed slave timing unit (STU) resides in one of the base stations $22_1$ through $22_n$. Action 7-1, corresponding to step 6-1 of FIG. 6, shows the ANALYZE_SFC command message as having the time stamp value $t_1$.

When a synchronization message is received by a slave timing unit (STU), its time of reception is immediately determined as shown by state 8-0 (since, for an ANALYZE_SFC command message, the time of reception will be required for use as time stamp $t_2$). In the cage of the responding timing unit (RTU) being a slave timing unit (STU), the determination of the time of reception is facilitated by the hardware of FIFO buffer 110SFC which, as mentioned above, supports SFCP message handling by processor (BP) 102. The determination of the time of reception is made by the responding timing unit (RTU) with reference to the current value of its own system frame counter (SFC) 100 when the command message is received.

As shown by state 8-1, the processor of the responding timing unit (RTU) analyzes or decodes the synchronization message to determine its type. In other words, the responding timing unit (RTU) examines the payload type field 10-T (see FIG. 10) to determine whether the synchronization message is a SET_SFC command message, an ANALYZE_SFC command message, or an ADJUST_SFC command message.

In the case of reception of an ANALYZE_SFC command message, the responding timing unit (RTU) enters state 8-2 to perform the series of actions indicated by steps 8-2A through 8-2D. At step 8-2A, time of reception of the command message as determined at state 8-0 is used as time stamp $t_2$. Step 8-2B shows the processor of the responding timing unit (RTU) preparing a ANALYZE_SFC response message which thus far includes, e.g., the time stamp $t_2$. At step 8-2C—just before the response message is to be dispatched—the responding timing unit (RTU) determines the current value of its own system frame counter (SFC)

100S, i.e., at the time the responding timing unit (RTU) sends an ANALYZE_SFC response message back to initiating timing unit (ITU). The value of system frame counter (SFC) 100S of the responding timing unit (RTU) at the time the responding timing unit (RTU) sends an ANALYZE_SFC response message is illustrated as $t_3$. Then, as shown by step 8-2D in FIG. 8, the time stamp $t_3$ is included in the ANALYZE_SFC response message sent back to the initiating timing unit (ITU). The actual sending of messages from the responding timing unit (RTU) to the initiating timing unit (ITU) is shown by state 8-3 in FIG. 8.

The parameter $t_3$ is employed in the event that the processing time is other than negligible. The parameter $t_3$ is added to the ANALYZE_SFC response message as late as possible before the response messages is dispatched. In other words, the last transaction occurring with respect to transmission of the response message is insertion of the $t_3$ value.

The transmission of the ANALYZE_SFC response message from the slave timing unit (STU) to master timing unit (MTU) 60 is shown as event 7-2 in FIG. 7. As shown in FIG. 7, the ANALYZE_SFC response message returned as event 7-2 includes the three time stamps $t_1$, $t_2$, and $t_3$. These three time stamp values $t_1$, $t_2$, and $t_3$ are stored in fields 10A-$t_1$, 10A-$t_2$, and 10A-$t_3$, respectively, of the payload of the ANALYZE_SFC response message.

Step 6-2 of FIG. 6A shows determining whether the addressed slave timing unit (STU) responded within a predetermined time-out window. That is, if no ANALYZE_SFC response message is received within the predetermined time-out window, at step 6-3 master timing unit (MTU) 60 stores a "no answer" indication for the addressed slave timing unit (STU) in an alarm log maintained by master timing unit (MTU) 60. Further, at step 6-4, master timing unit (MTU) 60 generates an appropriate notification.

Assuming that an ANALYZE_SFC response message is timely received by master timing unit (MTU) 60 from the addressed slave timing unit (STU), at step 6-5 the master timing unit (MTU) 60 determines the value of its system frame counter (SFC) 100 upon receipt of the ANALYZE_SFC response message. The value of the system frame counter (SFC) 100 of master timing unit (MTU) 60 upon receipt of the ANALYZE_SFC response message is denoted as $t_4$. Although the value of $t_4$ is not included in the ANALYZE_SFC response message, FIG. 7 shows that master timing unit (MTU) 60 of radio network controller (RNC) 30 has this information as well as the values $t_1$–$t_3$ upon receipt of the ANALYZE_SFC response message. Then, at step 6-6, master timing unit (MTU) 60 stores each of the values of $t_1$–$t_4$ for the addressed slave timing unit (STU) in another log known as the analysis log.

At step 6-7 master timing unit (MTU) 60 uses the values contained in the ANALYZE_SFC response message to determine whether the value of the system frame counter (SFC) of the slave timing unit (STU) is within a specified range relative to the system frame counter (SFC) of master timing unit (MTU) 60. The specified range can depend on the nature of the nodes in which the master timing unit (MTU) 60 and slave timing unit (STU) are situated. When the initiating timing unit (ITU) 60 is a master timing unit (MTU) 60 in a radio network controller (RNC) and the responding timing unit (RTU) is a slave timing unit (STU) in a base station, the specified range could extend from plus or minus 2 milliseconds to plus or minus 5 milliseconds, for example. In the case of the initiating timing unit (ITU) and the responding timing unit (RTU) being in differing radio network controllers (RNCs), on the other hand, the resolution and specified range is more critical.

For sake of simplicity of discussion, it will first be assumed that the value of the system frame counter (SFC) for slave timing unit (STU) is within the specified range relative to the value of the system frame counter (SFC) of master timing unit (MTU) 60. In such case, at step 6-8 the master timing unit (MTU) 60 sets a WITHIN_RANGE flag maintained for the addressed slave timing unit (STU) to zero. Then, at step 6-9, master timing unit (MTU) 60 determines whether it is time to transmit an ADJUST_SFC command message to the addressed slave timing unit (STU).

In one embodiment of the invention, in order to improve accuracy, plural ANALYZE_SFC command messages are transmitted from the initiating timing unit (ITU), and in response corresponding plural ANALYZE_SFC response messages are received at the initiating timing unit (ITU), each ANALYZE_SFC response message having its values $t_1$–$t_3$ to which a corresponding value $t_4$ is added. In this embodiment, the initiating timing unit (ITU) seeks to obtain a number of ANALYZE_SFC response messages in order to filter the response messages, and from the filtered response messages choose a representative ANALYZE_SFC response messages having average or median values $t_1$–$t_3$.

For the filtering and averaging embodiment described above, filtering and averaging step 6-10 is performed. Since the filtering and averaging step 6-10 is optional or applicable to one embodiment of the invention, step 6-10 is shown in broken lines in FIG. 6B. Step 6-10 is performed after it is determined at step 6-9 that enough ANALYZE_SFC messages have been sent with enough ANALYZE_SFC response messages received.

Step 6-9 may require, for example, that one hundred ANALYZE_SFC response messages be received, in which case at step 6-10 filtering may be performed by selecting of those only the ten ANALYZE_SFC response messages with the best (lowest) round trip delay time. Of the ten filtered ANALYZE_SFC response messages with the best (lowest) round trip delay time, one having median or average values $t_1$–$t_3$ can be chosen for the subsequent computations of step 6-11.

Figure 6:
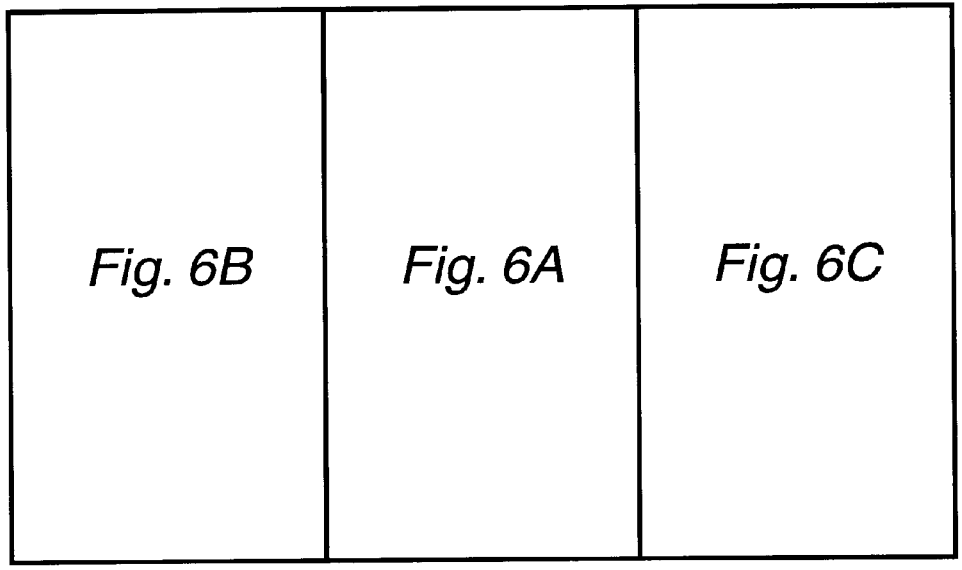
FIG. 6 is a diagrammatic view depicting a relationship between the flowcharts of FIG. 6A, FIG. 6B, and FIG. 6C.
Figure 6A:
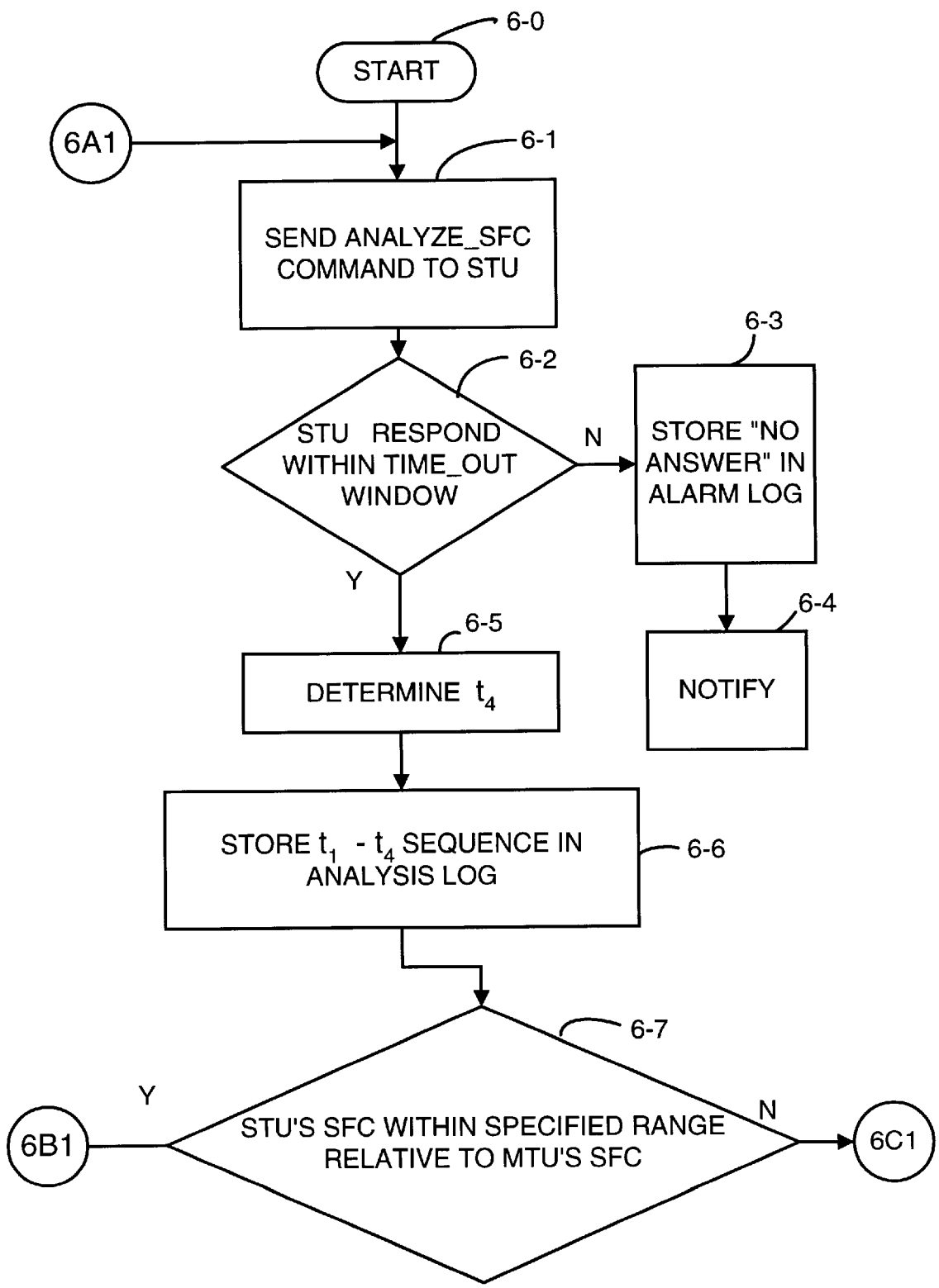
Figure 6B:
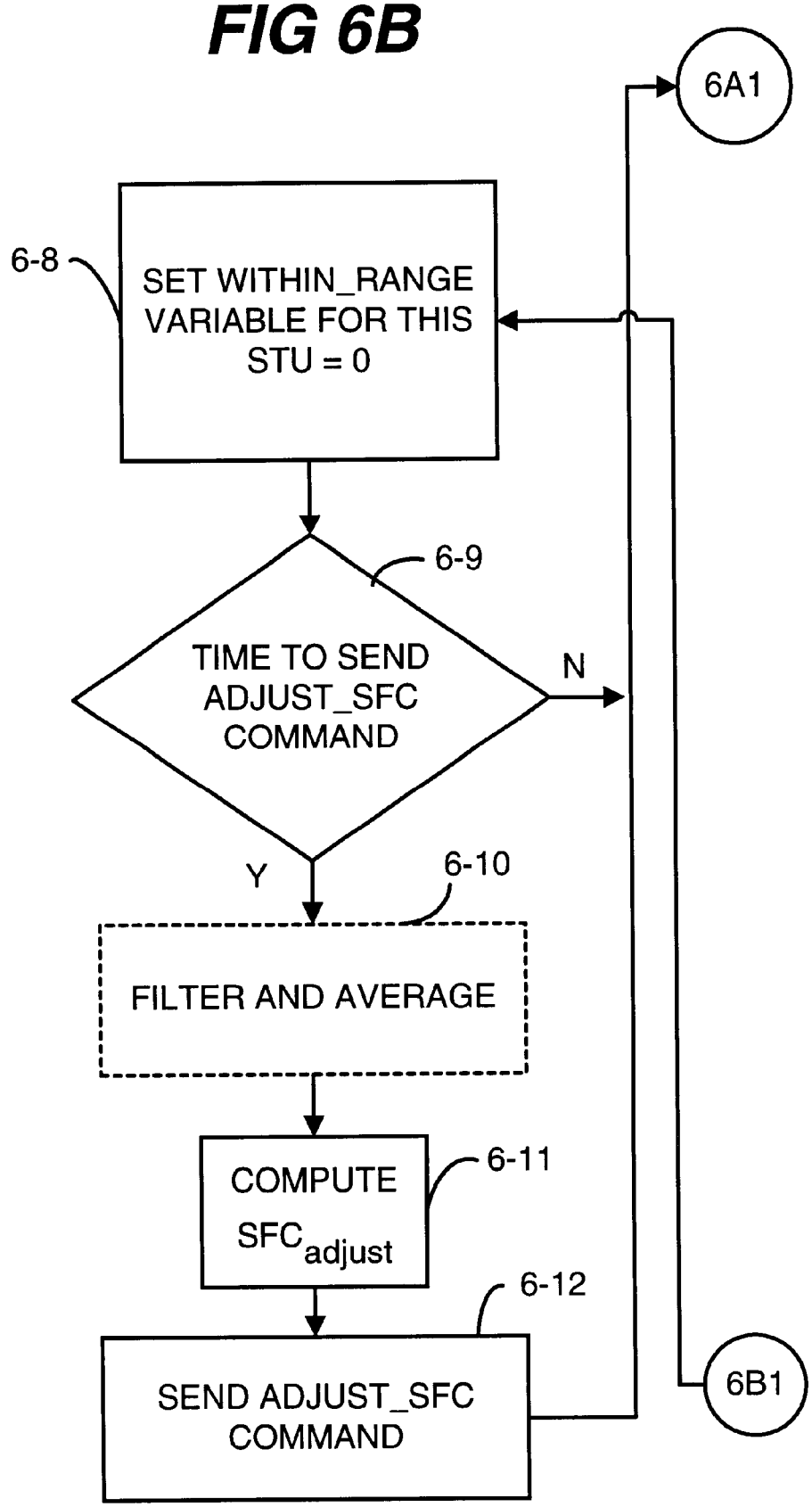

It should be understood that the filtering and averaging embodiment above discussed with respect to FIG. 6 and FIG. 7 is but one example of the initiating timing unit (ITU) determining when to send an ADJUST_SFC command. Other embodiments are within the scope of the invention. Other examples are (1) including sending an ADJUST_SFC command for each received ANALYZE_SFC response message; (2) using the shortest half of the number of sequences; (3) collecting the shortest $(t_2-t_1)+(t_4-t_3)$ as a group; (4) collecting the shortest $(t_2-t_1)+(t_4-t_3)$ respectively with no correlation between the two one way measurements; (5) collecting the shortest (e.g. with the above variations) measurements that has been received during a certain time (e.g., one hour; twenty four hours; one week, etc.); (6) making it possible to reset this log with "old" shortest measurements.

By whatever mode, if it is determined at step 6-9 (see FIG. 6B) that it is not yet time to transmit another ADJUST_SFC command message, execution loops back to step 6-1 (see FIG. 6A) where master timing unit (MTU) 60 awaits an indication that it is time to send another ANALYZE_SFC command message to the addressed slave timing unit (STU).

When it is time to send an ADJUST_SFC command message from master timing unit (MTU) 60 to the addressed slave timing unit (STU), an adjustment value, known as $SFC_{adjust}$, is determined at step 6-11. The adjustment value $SFC_{adjust}$, which is an offset value, is computed by master timing unit (MTU) 60 as follows:

$$SFC_{adjust} = t_{2\text{-}predicted} - t_2 \qquad \text{Equation 1}$$

in which $$t_{2\text{-}predicted} = ((t_1 + t_4)/2) - ((t_3 - t_2)/2). \qquad \text{Equation 2}$$

The value of $t_{2\text{-}predicted}$ is thus premised on the assumption that the uplink delay (UL) and downlink delay (DL) for the ANALYZE_SFC command message are identical. However, if $t_2$ should differ from $t_{2\text{-}predicted}$, the adjustment value $SFC_{adjust}$, is required for the slave timing unit (STU).

In the filtering and averaging embodiment, the values employed in evaluating Equation 1 and Equation 2 are the values determined at step 6-10 in accordance with whatever example of filtering and averaging may be employed.

In the first mode of the invention in which the master timing unit (MTU) 60 is the initiating timing unit (ITU), at step 6-12 the adjustment offset value, $SFC_{adjust}$, is sent from master timing unit (MTU) 60 to the addressed slave timing unit (STU) in an ADJUST_SFC command message. The format of the payload of the ADJUST_SFC command message is shown in FIG. 10C. Like earlier-discussed messages, the payload of the ADJUST_SFC command message includes a field 10C-C/R which indicates whether the message is a command or response; a user or sequence number field 10C-S; a payload length indicator field 10C-L; and a payload CRC field (field 10C-CRC). In addition, the payload of the ADJUST_SFC command message includes a field 10C-OV in which the adjustment offset value, $SFC_{adjust}$, is stored. Preferably, the adjustment offset value, $SFC_{adjust}$, has a value of plus or minus one second with a resolution of 125 microseconds.

Event 7-3 of FIG. 7 shows the ADJUST_SFC command message being transmitted from master timing unit (MTU) 60 of radio network controller (RNC) 30 to the addressed slave timing unit (STU) of a base station (BS) 22. After decoding of the message at the addressed slave timing unit (STU) as indicated by state 8-1, the slave timing unit (STU) enters a state 8-4 wherein it performs the steps/operations 8-4A through 8-4C shown in FIG. 8. At step 8-4A, the addressed slave timing unit (STU) decodes the adjustment offset value, $SFC_{adjust}$. Then, at step 8-4B, the addressed slave timing unit (STU) updates the value of its SFC counter as follows:

$$SFC = SFC + SFC_{adjust}. \qquad \text{Equation 3}$$

After updating the value of its system frame counter (SFC), the addressed slave timing unit (STU) generates a confirmation/response message (step 8-4C), which is transmitted to master timing unit (MTU) 60 as an ADJUST_SFC response message as indicated by state 8-3 of FIG. 8. Event 7-4 of FIG. 7 shows the transmission of an ADJUST_SFC response message from the addressed slave timing unit (STU) back to master timing unit (MTU) 60.

Should it be determined at step 6-7 (see FIG. 6A) that the system frame counter (SFC) of the addressed slave timing unit (STU) is not within the specified range relative to the system frame counter (SFC) of master timing unit (MTU) 60, at step 6-20 (see FIG. 6C) the master timing unit (MTU) 60 increments the WITHIN_RANGE variable for the addressed slave timing unit (STU) by one. Then, at step 6-21 the master timing unit (MTU) 60 determines whether the value of WITHIN_RANGE variable equals two. If the value of the WITHIN_RANGE variable has not yet reached two but instead is one, a further opportunity is provided to adjust the system frame counter (SFC) of the addressed slave timing unit (STU). In this regard, if the value of the WITHIN_RANGE variable is one, steps 6-22 through 6-25 are performed.

Figure 9:
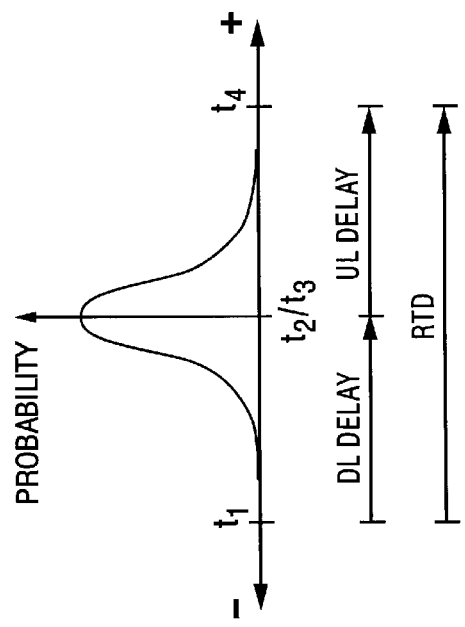
FIG. 9 is a graphical view showing a mode of determining probability for round trip delay (RTD) in accordance with the present invention.

When the value of the WITHIN_RANGE variable is one, at step 6-22 (see FIG. 6C) the master timing unit (MTU) 60 sends a series of ANALYZE_SFC command messages to the addressed slave timing unit (STU). The format of the ANALYZE_SFC command message has been previously discussed, e.g., with reference to step 6-1 and FIG. 10A, as well as the responsive ANALYZE_SFC response messages (see state 8-2 in FIG. 8). Master timing unit (MTU) 60 calculates, with respect to each paired ANALYZE_SFC command message and ANALYZE_SFC response message, a round trip delay (RTD) value. As understood from FIG. 9, each round trip delay (RTD) value is expressed using the various time stamps, particularly $t_1$ and $t_4$, obtained in connection with each pair of ANALYZE_SFC command and ANALYZE_SFC response messages. FIG. 9 shows the downlink delay DL between time stamp $t_1$ and $t_2$, as well as the uplink delay UL between time stamp $t_3$ and $t_4$. In FIG. 9, the processing time at the slave timing unit (STU) is considered as negligible. In view of the series of paired ANALYZE_SFC command and ANALYZE_SFC response messages, at step 6-23 the master timing unit (MTU) 60 determines a mean value of the round trip delay (RTD).

Determination of the mean value of the round trip delay (RTD) assists in enabling the master timing unit (MTU) 60 at step 6-24 to determine an appropriate SFC set value to be transmitted to the addressed slave timing unit (STU) for storage in the system frame counter (SFC) of the addressed slave timing unit (STU). If the mean value of the round trip delay (RTD) is relatively short compared with the SFC length (which is the normal case), then the SFC set value to be used in the SET_SFC command can be the SFC value of the master timing unit (MTU) 60. If the mean value of the round trip delay (RTD) is not relatively short, one technique for determining an appropriate SFC set value is to increase the SFC value of the master timing unit (MTU) 60 by half the mean value of the round trip delay (RTD), and to use such adjusted SFC value in the SET_SFC command.

Step 6-25 (see FIG. 6C) shows actual transmission of the SET_SFC command message containing the SFC set value from master timing unit (MTU) 60 to system frame counter (SFC) 100 of the addressed slave timing unit (STU). As shown in FIG. 10B, the SFC set value is contained in field 10B-V of the payload of the SET_SFC command message. Upon reception at slave timing unit (STU), the SET_SFC command message is decoded (see state 8-1 in FIG. 8). Upon determining that the received message is a SET_SFC command message, state 8-5 of slave timing unit (STU) is entered for complying with and responding to the SET_SFC command message. State 8-5 includes step 8-5A of loading the SFC set value received in field 10B-V of the SET_SFC command message into the system frame counter (SFC) of the addressed slave timing unit (STU). This can be done by applying a load enable signal and the SFC set value respectively to a load enable pin and to preset count pins of the system frame counter (SFC). Then, at step 8-5B a SET_SFC response message is generated. At state 8-3 the SET_SFC response message is sent from the addressed slave timing unit (STU) to master timing unit (MTU) 60.

If, after performance of steps 6-22 through 6-25 the value of the WITHIN_RANGE variable is again incremented (at step 6-20) without having been reset to zero (as would occur at step 6-8), the check at step 6-21 (for a WITHIN_RANGE variable value of two) is affirmative. When the value of the WITHIN_RANGE variable reaches two, at step 6-30 master timing unit (MTU) 60 stores a "responding but faulty" indication in its alarm log relative to the addressed slave timing unit (STU). Then, at step 6-31, master timing unit (MTU) 60 provides a notification of a fault relative to the addressed slave timing unit (STU).

The actions of FIG. 6A, FIG. 6B, and FIG. 6C have been described above as being performed for an "addressed" one of the slave timing units (STUs). However, it should be understood that the actions of FIG. 6A, FIG. 6B, and FIG. 6C are performed individually for each slave timing unit (STU) controlled by master timing unit (MTU) 60. As indicated above, handling of the actions of FIG. 6A, FIG. 6B, and FIG. 6C for each slave timing unit (STU) can be performed in a number of ways, e.g., in a multitasking approach with a task for each slave timing unit (STU) or in a looped approach including all slave timing units (STUs) [keeping parameters and variables distinct for each slave timing unit (STU)].

The preceding discussion of FIG. 6A, FIG. 6B, FIG. 6C, and FIG. 7 concerns a first mode of the invention wherein the master timing unit (MTU) 60 serves at the initiating timing unit (ITU), while the slave timing unit (STU) serves as the responding timing unit (RTU). The situation is essentially reversed in a second embodiment which is described with reference to FIG. 11A, FIG. 11B, FIG. 11C, and FIG. 12. In this second embodiment, the slave timing unit (STU) serves as the initiating timing unit (ITU), while the master timing unit (MTU) 60 serves as the responding timing unit (RTU).

Figure 11:
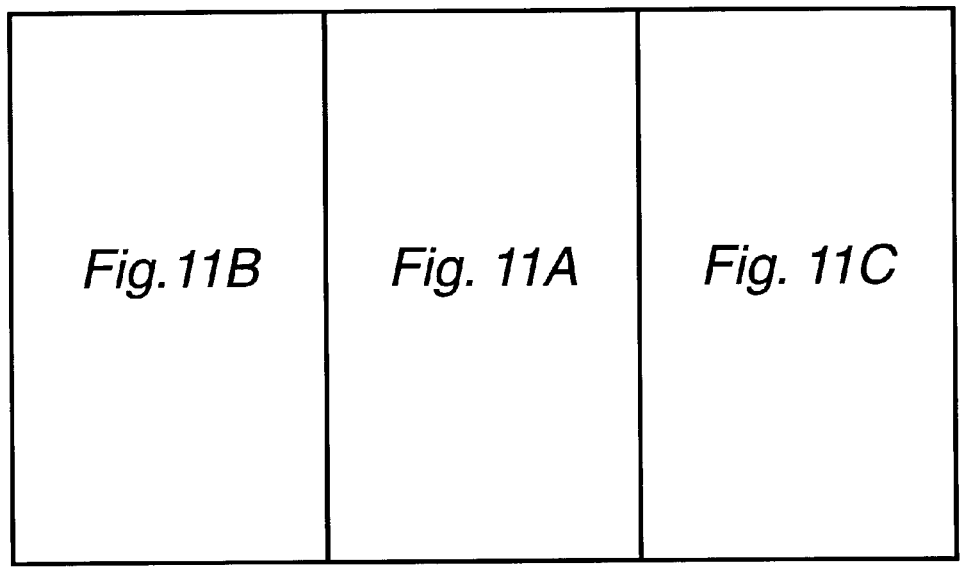
FIG. 11 is a diagrammatic view depicting a relationship between the flowcharts of FIG. 11A, FIG. 11B, and FIG. 11C.
Figure 11A:
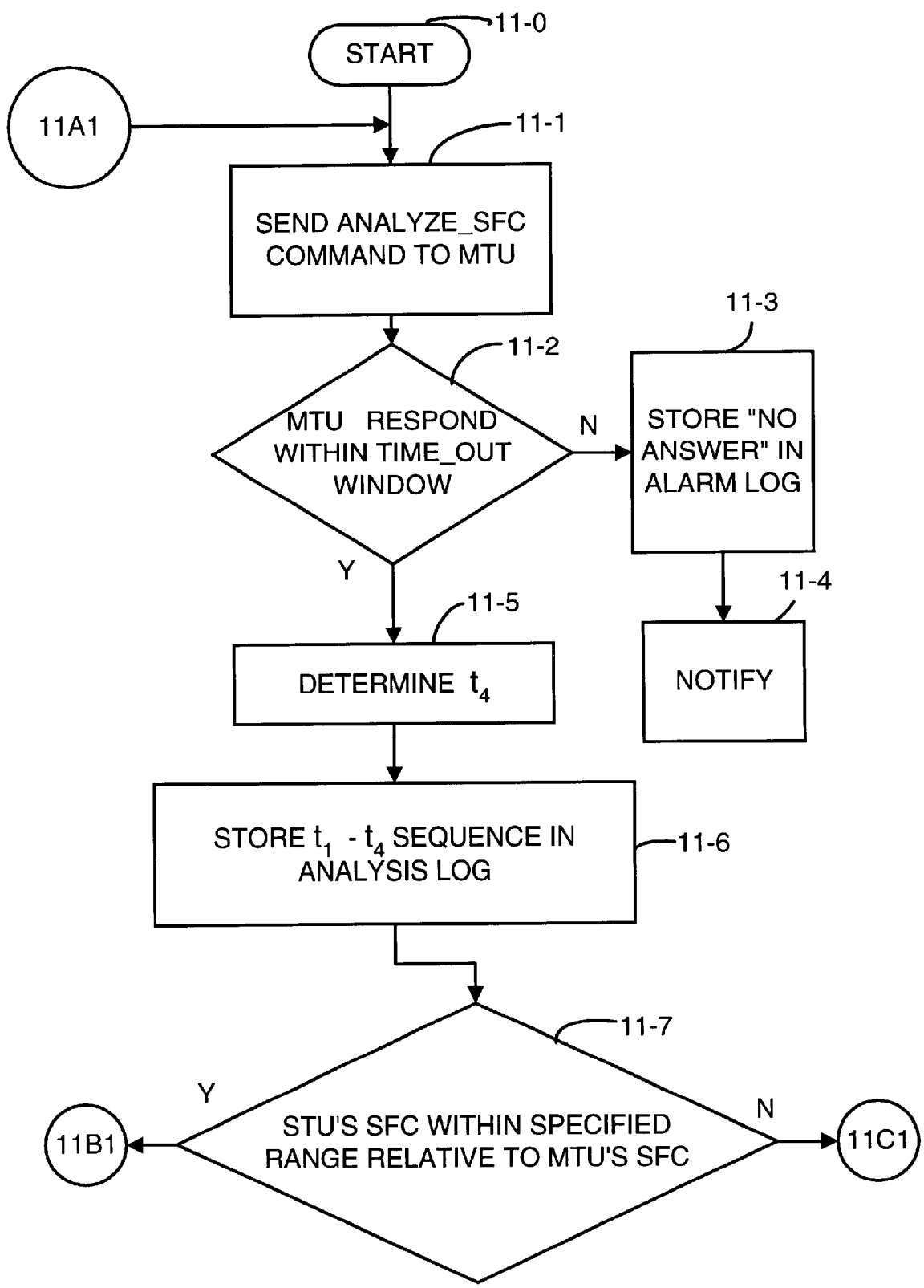
Figure 11B:
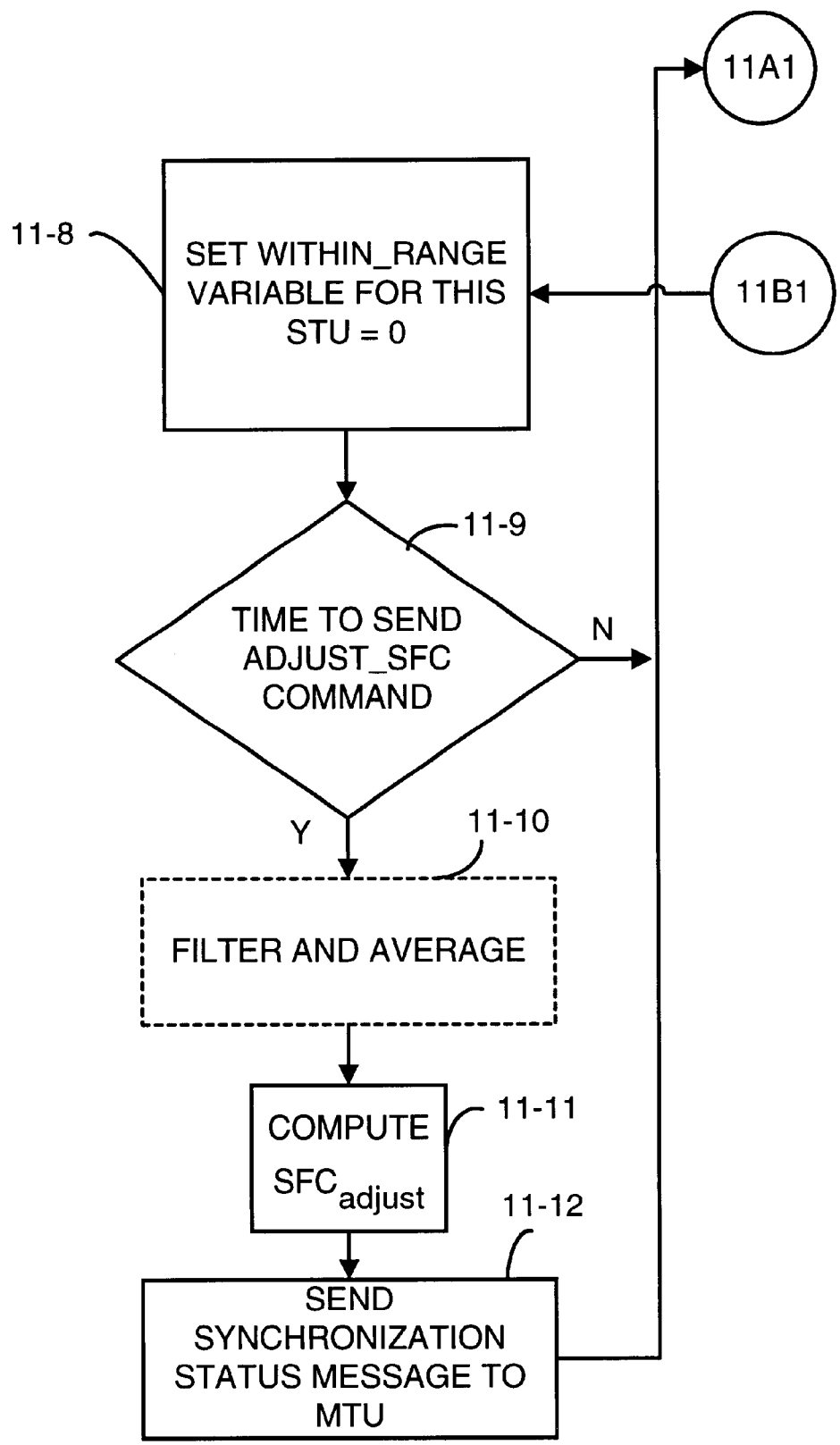

In the second embodiment, steps 11-0 through 11-12 of FIG. 11A, FIG. 11B, and FIG. 11C essentially respectively correspond to steps 6-0 through 6-12 of FIG. 6A, FIG. 6B, and FIG. 6C. However, the roles of master timing unit (MTU) 60 and the slave timing unit (STU) are reversed, as also illustrated in FIG. 12.

Figure 12:
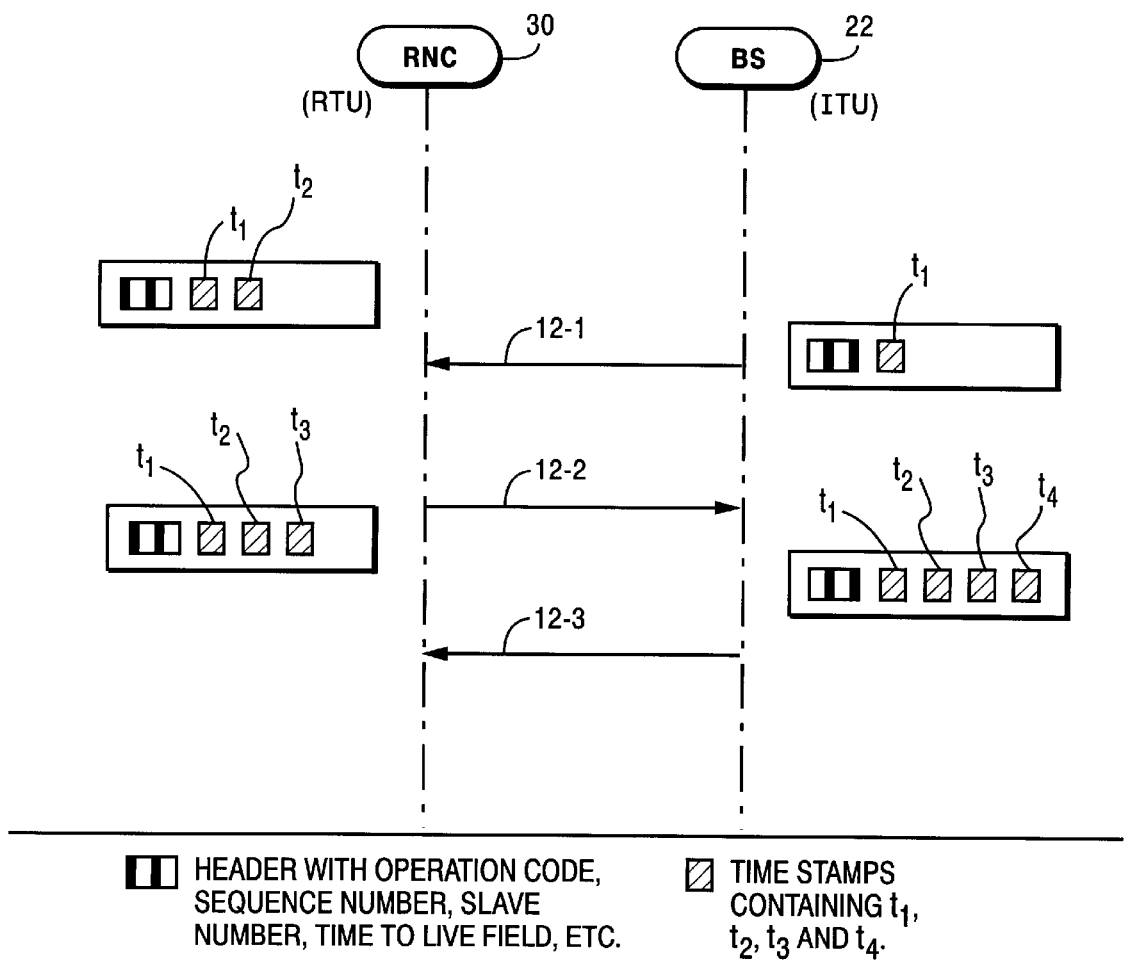
FIG. 12 is a diagrammatic view showing a sequence of synchronization messages transmitted in accordance with the mode of FIG. 11.

In the above regard, at step 11-1 the ANALYZE_SFC command is sent from the slave timing unit (STU) to master timing unit (MTU) 60, as indicated by arrow 12-1 in FIG. 12. The responsive actions of master timing unit (MTU) 60, upon receiving the ANALYZE_SFC command, are understood with respect to FIG. 8, particular state 8-2 thereof. Upon completing state 8-2, master timing unit (MTU) 60 sends an ANALYZE_SFC response message to slave timing unit (STU), as indicated by arrow 12-2 in FIG. 12. Upon receiving the ANALYZE_SFC response message, the slave timing unit (STU) computes $t_4$ (see step 11-5), and thereafter stores all values $t_1$ through $t_4$ in its analysis log (step 11-6).

When it comes time to compute a synchronization adjustment (determined at step 11-9 [see FIG. 11B]), the slave timing unit (STU) can perform filtering and averaging at step 11-10 in similar manner as above discussed with respect to step 6-10. Moreover, the computation of the adjustment value $SFC_{adjust}$ is made at step 11-11 using equations Equation 4 and Equation 5. That is, when the initiating unit is the slave unit, the slave unit determines the synchronization adjustment value $SFC_{adjust}$ by comparing $t_1$ with a predicted $t_1$ value, i.e., $t_{1\text{-}predicted}$ as follows:

$$SFC_{adjust} = t_{1\text{-}predicted} - t_1 \quad \text{Equation 4}$$

The predicted first time stamp value $t_{1\text{-}predicted}$ is determined according to Equation 5:

$$t_{1\text{-}predicted} = ((t_2 + t_3)/2) - ((t_4 - t_1)/2) \quad \text{Equation 5}$$

Thus, in this second mode, the corrected value is $t_1$ (not $t_2$), since the $t_1$ and $t_4$ time stamp values in the second mode represent the slave units time perception (which is subject to correction). At step 11-11, the slave timing unit (STU) uses the adjustment value $SFC_{adjust}$ (as an offset) to adjust its SFC.

In this second mode of the invention, upon computation of the adjustment value $SFC_{adjust}$, at step 11-12 the slave timing unit (STU) sends a state synchronization status message to the master timing unit as depicted by arrow 12-3 in FIG. 12. The slave timing unit (STU) thus advises the master timing unit (MTU) whether or not the STU is in range, thereby enabling the RNC and thus the network to know the status of the system in the same manner as in the first mode of the invention.

Should it be determined at step 11-7 (see FIG. 11A) that the SFC value of the slave timing unit (STU) is not within a specified range relative to the SFC value of 60, then the slave timing unit (STU) conducts step 11-20 and 11-21, and either steps 11-22 through 11-25 or 11-30 through 11-31 (see FIG. 11C), in analogous manner comparably numbered steps of FIG. 6C. In connection with the steps of FIG. 11C, however, it should be understood that the ANALYZE_SFC commands are sent from the slave timing unit (STU), and that the STU determines the mean value of the round trip delay (step 11-23) and the SFC set value (step 11-24). At step 11-25, the STU uses the SET_SFC value to adjust the SFC value.

Thus, in one example of the present invention, a CDMA network 20 synchronizes plural base stations 22 relative to an upper node (radio network controller (RNC) 30). The network 20 implements synchronization using ANALYZE_SFC command messages and ANALYZE_SFC response messages transmitted between the radio network controller (RNC) 30 and the base stations 22. The ANALYZE_SFC command message sent between the radio network controller (RNC) 30 and responding timing unit (RTU) includes the send time $t_1$ of the ANALYZE_SFC command message based on the SFC (synchronization frame counter) time at the initiating timing unit (ITU). When a responding timing unit (RTU) receives the ANALYZE_SFC command message, the responding timing unit (RTU) returns an ANALYZE_SFC response message. The ANALYZE_SFC response message includes both the arrival time $t_2$ of the ANALYZE_SFC command message at the responding timing unit (RTU), and the departure time $t_3$ of the ANALYZE_SFC response message based on SFC time of the responding timing unit (RTU)(as well as the time $t_1$). Upon receipt of the ANALYZE_SFC response message, the initiating timing unit (ITU) notes the time $t_4$ according to the SFC counter at which initiating timing unit (ITU) receives the ANALYZE_SFC response message. The initiating timing unit (ITU) then determines a predicted value of one of the time stamps (e.g. time stamp $t2$ if the MTU is the initiating unit; time step $t_1$ if the STU is the initiating unit) using a first equation; and compares the predicted time stamp value with the actual time stamp value as received in the ANALYZE_SFC response message. With optional filtering and averaging, the initiating timing unit (ITU) then determines an adjustment value for the SFC of the slave timing unit according to a second equation. In a mode of the invention in which the master timing unit (MTU) 60 is the initiating timing unit (ITU), at an appropriate juncture the master timing unit (MTU) 60 sends a ADJUST_SFC command message to the slave timing unit. In a mode of the invention in which the initiating timing unit (ITU) is the slave timing unit (STU), the slave timing unit (STU) corrects its SFC using the adjustment value which it determines.

The system frame counters (SFC) of the present invention have a sufficient resolution (e.g., 125 microseconds) to make the sequence issuing therefrom essentially future-proof in terms, e.g., of considerable number of additional slave timing units (STUs) being added at a future point in time.

The present invention thus provides a system frame counter (SFC) protocol, referenced as SFCP, between a master timing unit (MTU) of an upper node and slave timing units. With reference to the relationship of master timing unit (MTU) 60 relative to the slave timing units (STUs) 70 of the base stations 22, the system frame counter protocol is illustrated in FIG. 1 as the broken lined labeled SFCP.

Figure 13:
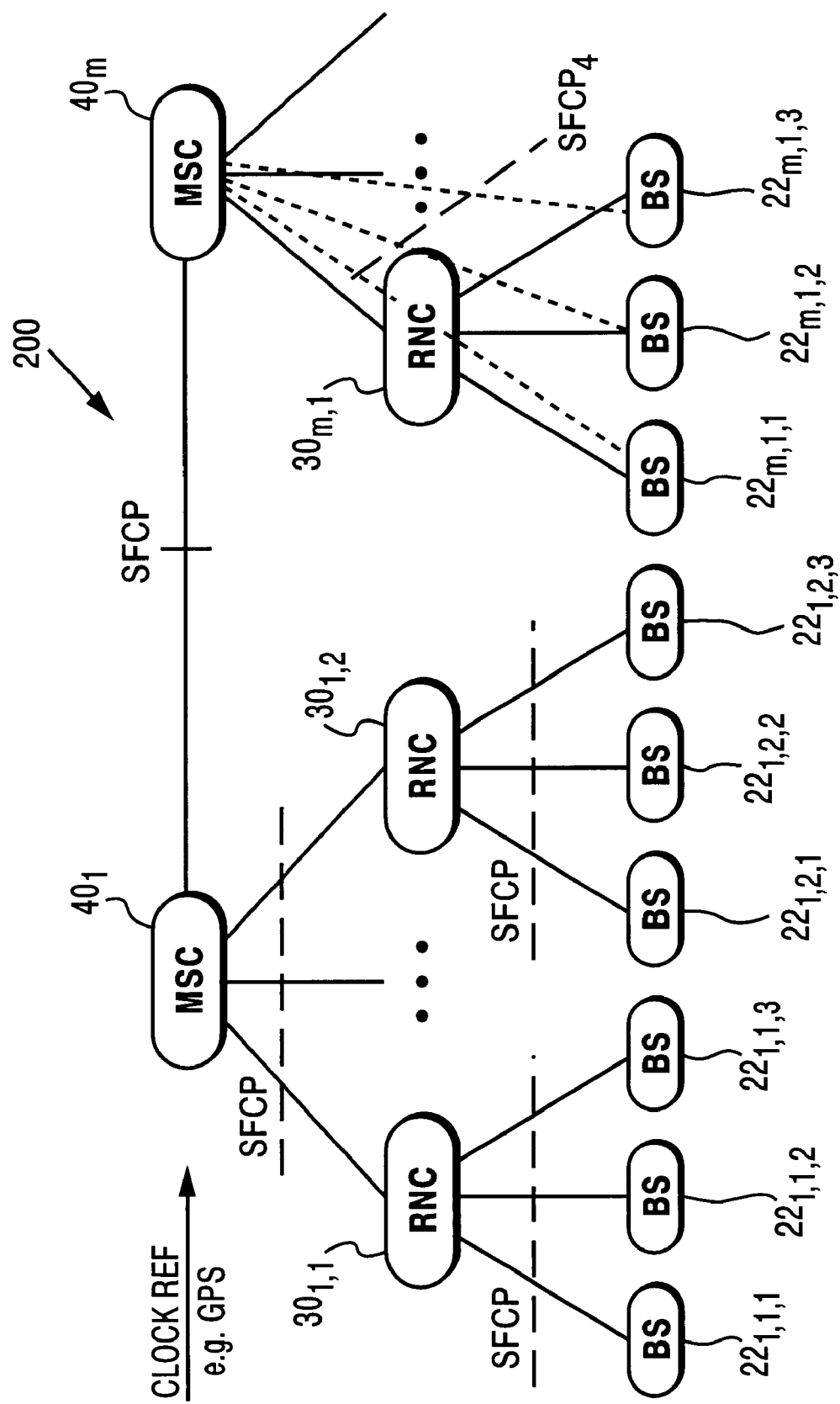
FIG. 13 is a schematic view of a cellular telecommunications network according to another embodiment of the invention.

It should be understood that the embodiment of FIG. 1 employs a single level of system frame counter protocol (SFCP), but that additional levels can also be employed. For example, FIG. 13 shows a cellular telecommunications network 200 having plural mobile switching centers (MSCs) 40$_1$ through 40$_m$, with each mobile switching center (MSC) having one or more radio network controllers (RNCs) 30 connected thereto. Each radio network controller (RNC) 30 controls plural base stations 22.

In the network 200 of FIG. 13, two levels of system frame counter protocol (SFCP) are employed for mobile switching center 40$_1$. A first level of system frame counter protocol (SFCP) exists between an RNC 30$_{1,1}$ and the base stations controlled thereby (e.g., base stations 22$_{1,1,1}$–22$_{1,1,3}$). Similarly, a first level of system frame counter protocol (SFCP) exists between an RNC 30$_{1,2}$ and the base stations controlled thereby (e.g., base stations 22$_{1,2,1}$–22$_{1,2,3}$). A second level of system frame counter protocol (SFCP) exists between the two RNC nodes (eg.i, RNC 30$_{1,1}$ and RNC 30$_{1,2}$) and mobile switching center 40$_1$. In this manner, master timing units in the RNC nodes are made subservient to a comparable but superior master timing unit in mobile switching center 40$_1$ in a strictly hierarchical manner.

FIG. 13 also shows, with respect to mobile switching center 40$_m$, a hierarchical arrangement wherein a master timing unit located in mobile switching center 40$_m$ controls slave timing units in base stations BS 22$_{m,1,1}$–22$_{m,1,3}$, as well as slave timing units in RNCs controlled thereby (e.g., RNC 30$_{m,1}$. In this situation, the system frame counter protocol (SFCP) interface is shown as being between mobile switching center 40$_m$ and the base stations 22$_{m,1,1}$–22$_{m,1,3}$. FIG. 13 also shows that network 20 permits a combination and mix of system frame counter protocol (SFCP), with mobile switching center 40$_1$ having a two-level strictly hierarchical arrangement and mobile switching center 40$_m$ having a single level, node-skipping hierarchical arrangement respecting system frame counter protocol (SFCP).

It should be understood that the ANALYSIS_SFC response message need not, in other embodiments, include all four time parameters $t_1$ through $t_4$. Rather, in the other embodiments, the responsibility of gathering time parameters such as $t_1$ through $t_4$ can be distributed to more than one command or message. For example, a first command may elicit from the responding timing unit a response message with the time stamps $t_1$ and $t_2$, while a second command obtains a response message with the time stamp $t_3$, for example.

Moreover, it should be understood that round trip delay (RTD) measurements need not obtain intermediate time stamps (e.g., $t_2$ and $t_3$) from the responding timing unit if the processing time is negligible at the time unit whereat $t_2$ and $t_3$ would be determined. In other words, the round trip delay (RTD) is measured according to Equation 6 in which a processing delay term $[(t_3-t_2)/2]$ is optional and need be evaluated only when such term is not negligible.

$$RTD=[(t_4-t_1)/2]-[(t_3-t_2)/2] \qquad \text{Equation 6}$$

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while the nodes of the illustrated embodiment are ATM-based, non-ATM systems in which frames and synchronization messages are sent in other than ATM cells are contemplated (e.g., Frame Relay or any other technique where commands and responses are utilized). Moreover, while the synchronization principles of the present invention are not limited to a master timing unit in a radio network controller (RNC) and a slave timing unit in a base station (BS) node, as synchronization between other nodes are also envisioned.

What is claimed is:

1. A cellular telecommunications network comprising:
   a master timing unit located at a control node of the network;
   a slave timing unit located at the control node or a controlled node of the network;
   wherein one of the master timing unit and the slave timing unit serves as an initiating timing unit for transmitting a synchronization analysis command message including a first parameter to a responding timing unit, the responding timing unit being the other of the master timing unit and the slave timing unit the first parameter being a first time stamp value $t_1$ related to the time that the synchronization analysis command message is transmitted from the initiating timing unit;
   wherein in response to the synchronization analysis command the responding timing unit sends a synchronization analysis response message including a second parameter to the initiating timing unit, the second parameter being a second time stamp value $t_2$ related to the time that the synchronization analysis command message is received at the responding timing unit;
   wherein the initiating timing unit uses the first parameter and the second parameter included in the synchronization analysis response message to determine a synchronization adjustment for the slave timing unit.

2. The network of claim 1, wherein the initiating timing unit is the master timing unit, and wherein the master timing unit transmits the synchronization adjustment in a synchronization adjustment command message to the slave timing unit.

3. The network of claim 1, wherein the initiating timing unit is the slave timing unit, and wherein the slave timing unit uses the synchronization adjustment value to synchronize a clock of the slave timing unit with a clock of the master timing unit.

4. The network of claim 1, wherein the synchronization adjustment is a synchronization offset value.

5. The network of claim 1, wherein the initiating timing unit is located in a control node that controls a base station node, and the responding timing unit is located in the base station node.

6. The network of claim 1, wherein the responding timing unit is located in a control node that controls a base station node, and the initiating timing unit is located in the base station node.

7. The network of claim 1, wherein the initiating timing unit is located in a control node that controls a base station node.

8. The network of claim 1, wherein the network is code division multiple access (CDMA) cellular telecommunications network, and wherein the slave timing unit is located in a diversity handover unit situated at the control node.

9. The network of claim 1, wherein at least one of the synchronization analysis command message, the synchronization analysis message, and the synchronization adjustment command message are encapsulated in an asynchronous transfer mode (ATM) cell.

10. The network of claim 1, wherein prior to transmitting the synchronization adjustment command message, wherein the initiating timing unit is the master timing unit, wherein the master timing unit uses the synchronization analysis message to determine whether a slave counter value maintained by a slave counter in the slave timing unit is within a predetermined range of a master counter value maintained by a master counter in the master timing unit, and wherein if the slave counter value is not within the predetermined range of the master counter value, the master timing unit sends a set slave counter command message for loading a value related to the master counter value in the slave counter.

11. The network of claim 10, wherein if the slave counter value is not within the predetermined range of the master counter value, the master timing unit sends a series of synchronization analysis messages to the slave timing unit, and using a corresponding series of synchronization analysis messages determines a mean value of the round trip delay (RTD).

12. The network of claim 1, wherein the initiating timing unit transmits a series of synchronization analysis command messages and wherein the responding timing unit responsively sends a corresponding series of synchronization analysis response messages, and wherein the initiating timing unit performs at least one of filtering and averaging of parameter values ascertained from the synchronization analysis response messages to determine an appropriate synchronization adjustment value for the slave timing unit.

13. The network of claim 1, wherein the synchronization analysis response message includes both the first parameter and the second parameter.

14. A cellular telecommunications network comprising:
- a master timing unit located at a control node of the network;
- a slave timing unit located at the control node or a controlled node of the network;
- wherein one of the master timing unit and the slave timing unit serves as an initiating timing unit for transmitting a synchronization analysis command message including a first parameter to a responding timing unit, the responding timing unit being the other of the master timing unit and the slave timing unit;
- wherein in response to the synchronization analysis command the responding timing unit sends a synchronization analysis response message including a second parameter to the initiating timing unit;
- wherein the initiating timing unit determines a synchronization adjustment for the slave timing unit by using the first parameter and the second parameter included in the synchronization analysis response message and by comparing the second parameter included in the synchronization analysis response message with a predicted second parameter.

15. The network of claim 14, wherein the first parameter is a first time stamp value $t_1$ related to the time that the synchronization analysis command message is transmitted from the initiating timing unit and the second parameter is a second time stamp value $t_2$ related to the time that the synchronization analysis command message is received at the responding timing unit.

16. The network of claim 15, wherein the synchronization analysis response message sent by the responding timing unit to the initiating timing unit includes a third time stamp value $t_3$ related to the time that the synchronization analysis response message is sent from the responding timing unit, wherein the initiating timing unit determines a fourth time stamp value $t_4$ indicative of a time of reception of the synchronization sequence response message at the initiating timing unit, and wherein the predicted second time stamp value $t_{2\text{-}predicted}$ is determined as:

$$t_{2\text{-}predicted} = ((t_1+t_4)/2) - ((t_3-t_2)/2).$$

17. The network of claim 16, wherein the synchronization adjustment value is determined as $t_{2\text{-}predicted} - t_2$.

18. A cellular telecommunications network comprising:
- a master timing unit located at a control node of the network;
- a slave timing unit located at the control node or a controlled node of the network;
- wherein one of the master timing unit and the slave timing unit serves as an initiating timing unit for transmitting a synchronization analysis command message including a first parameter to a responding timing unit, the responding timing unit being the other of the master timing unit and the slave timing unit;
- wherein in response to the synchronization analysis command the responding timing unit sends a synchronization analysis response message including a second parameter to the initiating timing unit;
- wherein the initiating timing unit determines a synchronization adjustment for the slave timing unit by using the first parameter and the second parameter included in the synchronization analysis response message and by comparing the first parameter included in the synchronization analysis response message with predicted first parameter.

19. The network of claim 18, wherein the first parameter is a first time stamp value $t_1$ related to the time that the synchronization analysis command message is transmitted from the initiating timing unit and the second parameter is a second time stamp value $t_2$ related to the time that the synchronization analysis command message is received at the responding timing unit.

20. The network of claim 19, wherein the synchronization analysis response message sent by the responding timing unit to the initiating timing unit includes a third time stamp value $t_3$ related to the time that the synchronization analysis response message is sent from the responding timing unit, wherein the initiating timing unit determines a fourth time stamp value $t_4$ indicative of a time of reception of the synchronization sequence response message at the initiating timing unit, and wherein the predicted first time stamp value $t_{1\text{-}predicted}$ is determined as:

$$t_{1\text{-}predicted} = ((t_2+t_3)/2) - ((t_4-t_1)/2).$$

21. The network of claim 20, wherein the synchronization adjustment is determined as $t_{1\text{-}predicted} - t_1$.

22. A method of operating cellular telecommunications network comprising:
- transmitting a synchronization analysis command message including a first parameter from an initiating timing unit to a responding timing unit, the initiating timing unit being one of a master timing unit located at control node of the network and a slave timing unit located at the control node or a controlled node of the network, the responding timing unit being the other of the master timing unit and the slave timing unit, the first parameter being a first time stamp value $t_1$ related to the time that the synchronization analysis command message is transmitted from the initiating timing unit;

sending from the responding timing unit to the initiating timing unit, and in response to the synchronization analysis command message, a synchronization analysis response message including a second parameter, the second parameter being a second time stamp value $t_2$ related to the time that the synchronization analysis command message is received at the responding timing unit;

using, at the initiating time unit, the first parameter and the second parameter included in the synchronization analysis response message to determine a synchronization adjustment value for the slave timing unit.

23. The method of claim 22, wherein the initiating timing unit is the master timing unit, and wherein the method further comprises transmitting the synchronization adjustment value in a synchronization adjustment command message to the slave timing unit.

24. The method of claim 22, wherein the synchronization adjustment is a synchronization offset value.

25. The method of claim 22, wherein the initiating timing unit is located in a control node that controls a base station node, and the responding timing unit is located in the base station node.

26. The method of claim 22, wherein the responding timing unit is located in a control node that controls a base station node, and the initiating timing unit is located in the base station node.

27. The method of claim 22, wherein the master timing unit is located in a control node that controls a base station node.

28. The method of claim 22, wherein the network is code division multiple access (CDMA) cellular telecommunications network, and wherein the slave timing unit is located in a diversity handover unit situated at the control node.

29. The method of claim 22, further comprising encapsulating at least one of the synchronization analysis command message, the synchronization analysis response message, and the synchronization adjustment command message in an asynchronous transfer mode (ATM) cell.

30. The method of claim 22, further comprising, prior to transmitting the synchronization adjustment command message, the steps of:

using the synchronization analysis response message to determine whether a slave counter value maintained by a slave counter in the slave timing unit is within a predetermined range of a master counter value maintained by a master counter in the master timing unit; and if the slave counter value is not within the predetermined range of the master counter value, sending from the master timing unit a set slave counter command message for loading a value related to the master counter value in the slave counter.

31. The method of claim 30, further comprising, if the slave counter value is not within the predetermined range of the master counter value, the steps of:

sending from the master timing unit a series of synchronization analysis command messages to the slave timing unit;

using a corresponding series of synchronization analysis return messages to determine a mean value of the round trip delay (RTD).

32. The method of claim 22, further comprising transmitting, from the initiating timing unit, a series of synchronization analysis command messages;

responsively sending, from the responding timing unit, a corresponding series of synchronization analysis response messages; and performing at least one of filtering and averaging of parameter values ascertained from the synchronization analysis response messages to determine an appropriate synchronization adjustment value for the slave timing unit.

33. The method of claim 22, further comprising including in the synchronization analysis response message both the first parameter and the second parameter.

34. A method of operating cellular telecommunications network comprising:

transmitting a synchronization analysis command message including a first parameter from an initiating timing unit to a responding timing unit, the initiating timing unit being one of a master timing unit located at control node of the network and a slave timing unit located at the control node or a controlled node of the network, the responding timing unit being the other of the master timing unit and the slave timing unit;

sending from the responding timing unit to the initiating timing unit, and in response to the synchronization analysis command message, a synchronization analysis response message including a second parameter;

determining, at the initiating time unit, a synchronization adjustment value for the slave timing unit by using the first parameter and the second parameter included in the synchronization analysis response message and by comparing the second parameter included in the synchronization analysis response message with a predicted second parameter.

35. The method of claim 34, wherein the first parameter is a first time stamp value $t_1$ related to the time that the synchronization analysis command message is transmitted from the initiating timing unit and the second parameter is a second time stamp value $t_2$ related to the time that the synchronization analysis command message is received at the responding timing unit.

36. The method of claim 35, wherein the method further comprises:

including in the synchronization analysis message sent by the responding timing unit to the initiating timing unit a third time stamp value $t_3$ related to the time at which the synchronization analysis response message is sent from the responding timing unit; and determining at the initiating timing unit a fourth time stamp value $t_4$ indicative of a time of reception of the synchronization a analysis response message at the initiating timing unit; and determining the predicted second time stamp value $t_{2\text{-}predicted}$ using the following relation:

$$t_{2\text{-}predicted} = ((t_1+t_4)/2) - ((t_3-t_2)/2).$$

37. The method of claim 36, wherein the synchronization adjustment value is determined as $t_{2\text{-}predicted} - t_2$.

38. A method of operating cellular telecommunications network comprising:

transmitting a synchronization analysis command message including a first parameter from an initiating timing unit to a responding timing unit, the initiating timing unit being one of a master timing unit located at control node of the network and a slave timing unit located at the control node or a controlled node of the network, the responding timing unit being the other of the master timing unit and the slave timing unit;

sending from the responding timing unit to the initiating timing unit, and in response to the synchronization analysis command message, a synchronization analysis response message including a second parameter;

determining, at the initiating time unit, a synchronization adjustment value for the slave timing unit by using the first parameter and the second parameter included in the synchronization analysis response message and by comparing the first parameter included in the synchronization analysis response message with a predicted first parameter.

39. The method of claim 38, wherein the first parameter is a first time stamp value $t_1$ related to the time that the synchronization analysis command message is transmitted from the initiating timing unit and the second parameter is a second time stamp value $t_2$ related to the time that the synchronization analysis command message is received at the responding timing unit.

40. The method of claim 39, wherein the method further comprises:

including in the synchronization analysis message sent by the responding timing unit to the initiating timing unit a third time stamp value $t_3$ related to the time at which the synchronization analysis response message is sent from the responding timing unit; and determining at the initiating timing unit a fourth time stamp value $t_4$ indicative of a time of reception of the synchronization analysis response message at the initiating timing unit; and determining the predicted first time stamp value $t_{1\text{-}predicted}$ using the following relation:

$$t_{1\text{-}predicted}=((t_2+t_3)/2)-((t_4-t_1)/2).$$

41. The method of claim 40, wherein the synchronization adjustment value is determined as $t_{1\text{-}predicted}-t_1$.

42. A cellular telecommunications network comprising:

a master timing unit located at control node of the network;

a slave timing unit located at the control node or a controlled node of the network;

wherein one of the master timing unit and the slave timing unit serves as an initiating timing unit for transmitting a synchronization analysis command message including a first parameter to a responding timing unit, the responding timing unit being the other of the master timing unit and the slave timing unit;

wherein in response to the synchronization analysis command the responding timing unit sends a synchronization analysis response message including a second parameter to the initiating timing unit, the second parameter indicative of a time at which the synchronization analysis command message was received at the responding timing unit;

wherein the initiating timing unit uses the synchronization analysis response message to determine a synchronization adjustment for the slave timing unit.

43. A method of operating cellular telecommunications network comprising:

transmitting a synchronization analysis command message including a first parameter from an initiating timing unit to a responding timing unit, the initiating timing unit being one of a master timing unit located at control node of the network and a slave timing unit located at the control node or a controlled node of the network, the responding timing unit being the other of the master timing unit and the slave timing unit;

sending from the responding timing unit to the initiating timing unit, and in response to the synchronization analysis command message, a synchronization analysis response message including a second parameter indicative of when the synchronization analysis command message was received at the responding timing unit;

using the synchronization analysis response message at the initiating timing unit to determine a synchronization adjustment value for the slave timing unit.

44. A cellular telecommunications network comprising:

a master timing unit located at control node of the network;

a slave timing unit located at the control node or a controlled node of the network;

wherein one of the master timing unit and the slave timing unit serves as an initiating timing unit for transmitting a synchronization analysis command message including a first parameter to a responding timing unit, the responding timing unit being the other of the master timing unit and the slave timing unit;

wherein in response to the synchronization analysis command the responding timing unit sends a synchronization analysis response message including a second parameter to the initiating timing unit;

wherein the initiating timing unit uses the synchronization analysis response message to determine a synchronization adjustment for the slave timing unit; and wherein the initiating timing unit determines the synchronization updating value by comparing the second parameter included in tie synchronization analysis response message with a predicted second parameter.

45. The network of claim 44, wherein the first parameter is a first time stamp value $t_1$ related to the time that the synchronization analysis command message is transmitted from the initiating timing unit and the second parameter is a second time stamp value $t_2$ related to the time that the synchronization analysis command message is received at the responding timing unit.

46. A cellular telecommunications network comprising:

a master timing unit located at control node of the network;

a slave timing unit located at the control node or a controlled node of the network;

wherein one of the master timing unit and the slave timing unit serves as an initiating timing unit for transmitting a synchronization analysis command message including a first parameter to a responding timing unit, the responding timing unit being the other of the master timing unit and the slave timing unit;

wherein in response to the synchronization analysis command the responding timing unit sends a synchronization analysis response message including a second parameter to the initiating timing unit;

wherein the first parameter is a first time stamp value $t_1$ related to the time that the synchronization analysis command message is transmitted from the initiating timing unit and the second parameter is a second time stamp value $t_2$ related to the time that the synchronization analysis command message is received at the responding timing unit;

wherein the initiating timing unit uses the synchronization analysis response message to determine a synchronization adjustment for the slave timing unit;

wherein the synchronization analysis response message sent by the responding timing unit to the initiating timing unit includes a third time stamp value $t_3$ related to the time that the synchronization analysis response message is sent from the responding timing unit, wherein the initiating timing unit determines a fourth time stamp value $t_4$ indicative of a time of reception of the synchronization sequence response message at the initiating timing unit, and wherein the predicted second time stamp value $t_{2\text{-}predicted}$ is determined as:

$$t_{2\text{-}predicted}=((t_1+t_4)/2)-((t_3-t_2)/2).$$

47. The network of claim 46, wherein the synchronization adjustment value is determined as $t_{2\text{-}predicted}-t_2$.

48. A cellular telecommunications network comprising:
a master timing unit located at control node of the network;
a slave timing unit located at the control node or a controlled node of the network;
wherein one of the master timing unit and the slave timing unit serves as an initiating timing unit for transmitting a synchronization analysis command message including a first parameter to a responding timing unit, the responding timing unit being the other of the master timing unit and the slave timing unit;
wherein in response to the synchronization analysis command the responding timing unit sends a synchronization analysis response message including a second parameter to the initiating timing unit;
wherein the initiating timing unit uses the synchronization analysis response message to determine a synchronization adjustment for the slave timing unit; and
wherein the initiating timing unit determines the synchronization updating value by comparing the first parameter included in the synchronization analysis response message with a predicted first parameter.

49. The network of claim 48, wherein the first parameter is a first time stamp value $t_1$ related to the time that the synchronization analysis command message is transmitted from the initiating timing unit and the second parameter is a second time stamp value $t_2$ related to the time that the synchronization analysis command message is received at the responding timing unit.

50. The network of claim 49, wherein the synchronization analysis response message sent by the responding timing unit to the initiating timing unit includes a third time stamp value $t_3$ related to the time that the synchronization analysis response message is sent from the responding timing unit, wherein the initiating timing unit determines a fourth time stamp value $t_4$ indicative of a time of reception of the synchronization sequence response message at the initiating timing unit, and wherein the predicted first time stamp value $t_{1\text{-}predicted}$ is determined as:

$$t_{1\text{-}predicted}=((t_2+t_3)/2)-((t_4-t_1)/2).$$

51. The network of claim 50, wherein the synchronization adjustment value is determined as $t_{1\text{-}predicted}-t_1$.

52. A method of operating cellular telecommunications network comprising:
transmitting a synchronization analysis command message including a first parameter from an initiating timing unit to a responding timing unit, the initiating timing unit being one of a master timing unit located at control node of the network and a slave timing unit located at the control node or a controlled node of the network, the responding timing unit being the other of the master timing unit and the slave timing unit;
sending from the responding timing unit to the initiating timing unit, and in response to the synchronization analysis command message, a synchronization analysis response message including a second parameter;
using the synchronization analysis response message at the initiating timing unit to determine a synchronization adjustment value for the slave timing unit;
wherein the first parameter is a first time stamp value $t_1$ related to the time that the synchronization analysis command message is transmitted from the initiating timing unit and the second parameter is a second time stamp value $t_2$ related to the time that the synchronization analysis command message is received at the responding timing unit;
including in the synchronization analysis message sent by the responding timing unit to the initiating timing unit a third time stamp value $t_3$ related to the time at which the synchronization analysis response message is sent from the responding timing unit; and
determining at the initiating timing unit a fourth time stamp value $t_4$ indicative of a time of reception of the synchronization analysis response message at the initiating timing unit; and
determining the predicted second time stamp value $t_{2\text{-}predicted}$ using the following relation:

$$t_{2\text{-}predicted}=((t_1+t_4)/2)-((t_3-t_2)/2).$$

53. The method of claim 52, wherein the synchronization adjustment value is determined as $t_{2\text{-}predicted}-t_2$.

54. A method of operating cellular telecommunications network comprising:
transmitting a synchronization analysis command message including a first parameter from an initiating timing unit to a responding timing unit, the initiating timing unit being one of a master timing unit located at control node of the network and a slave timing unit located at the control node or a controlled node of the network, the responding timing unit being the other of the master timing unit and the slave timing unit;
sending from the responding timing unit to the initiating timing unit, and in response to the synchronization analysis command message, a synchronization analysis response message including a second parameter;
using the synchronization analysis response message at the initiating timing unit to determine a synchronization adjustment value for the slave timing unit;
wherein the first parameter is a first time stamp value $t_1$ related to the time that the synchronization analysis command message is transmitted from the initiating timing unit and the second parameter is a second time stamp value $t_2$ related to the time that the synchronization analysis command message is received at the responding timing unit;
including in the synchronization analysis message sent by the responding timing unit to the initiating timing unit a third time stamp value $t_3$ related to the time at which the synchronization analysis response message is sent from the responding timing unit; and
determining at the initiating timing unit a fourth time stamp value $t_4$ indicative of a time of reception of the synchronization analysis response message at the initiating timing unit; and
determining the predicted first time stamp value $t_{1\text{-}predicted}$ using the following relation:

$$t_{1\text{-}predicted}=((t_2+t_3)/2)-((t_4-t_1)/2).$$

55. The method of claim 54, wherein the synchronization adjustment value is determined as $t_{1\text{-}predicted}-t_1$.

* * * * *